Dec. 30, 1930.  H. J. WHITE  1,786,689
COMPLETELY AUTOMATIC GEAR CUTTING MACHINE
Filed Dec. 13, 1928    12 Sheets-Sheet 1
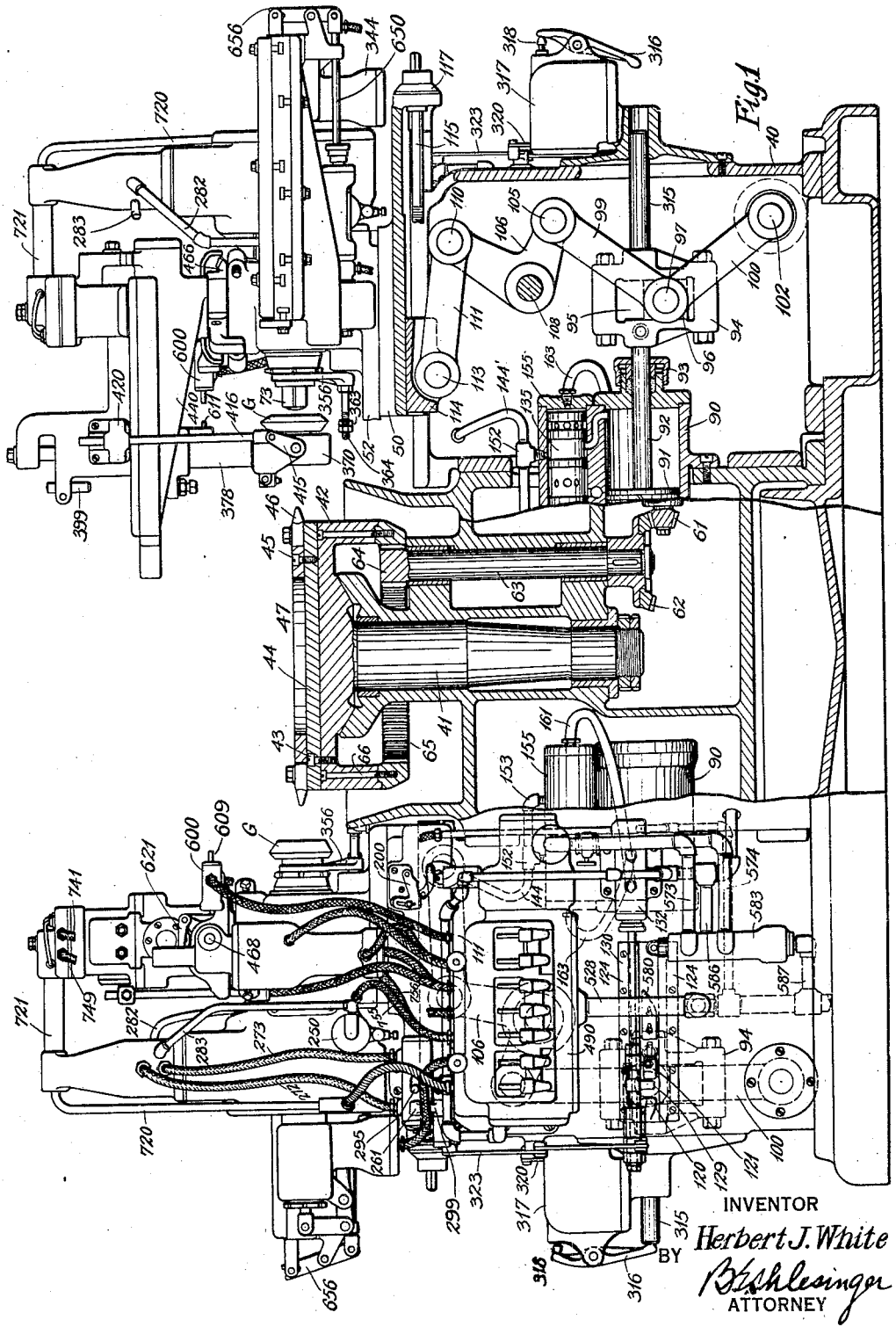
INVENTOR
Herbert J. White
BY B. Schlesinger
ATTORNEY

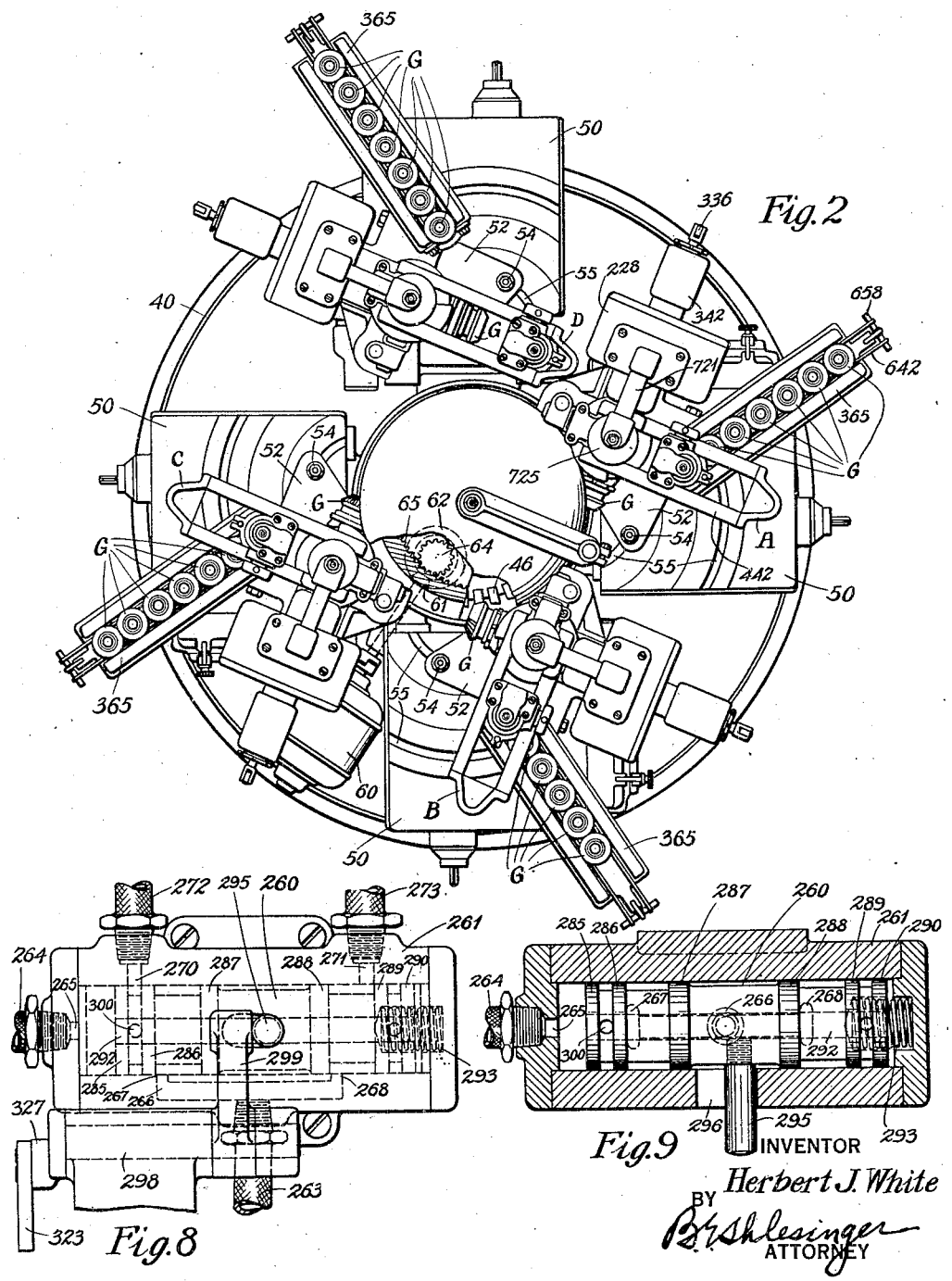

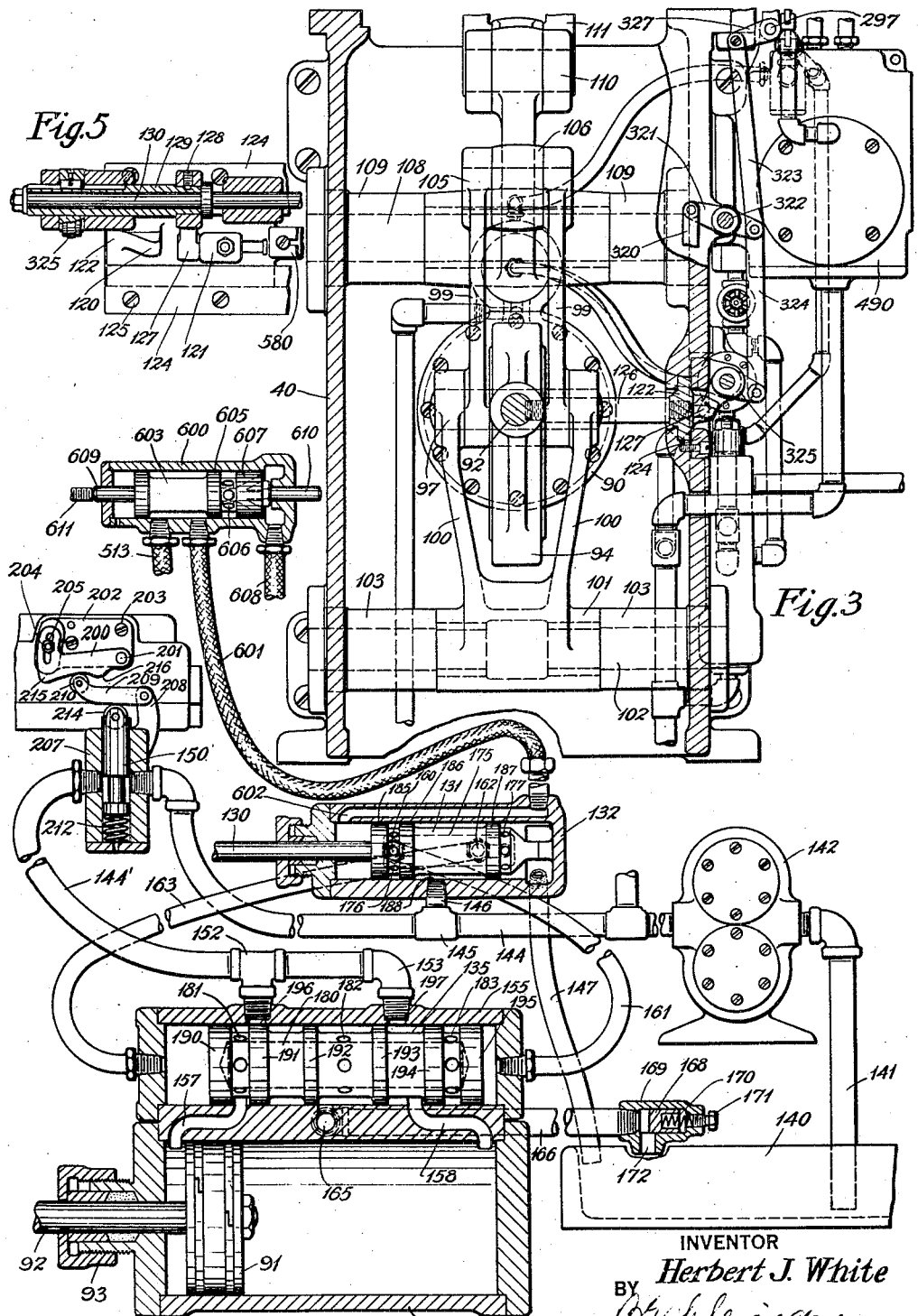

INVENTOR
Herbert J. White
BY
ATTORNEY

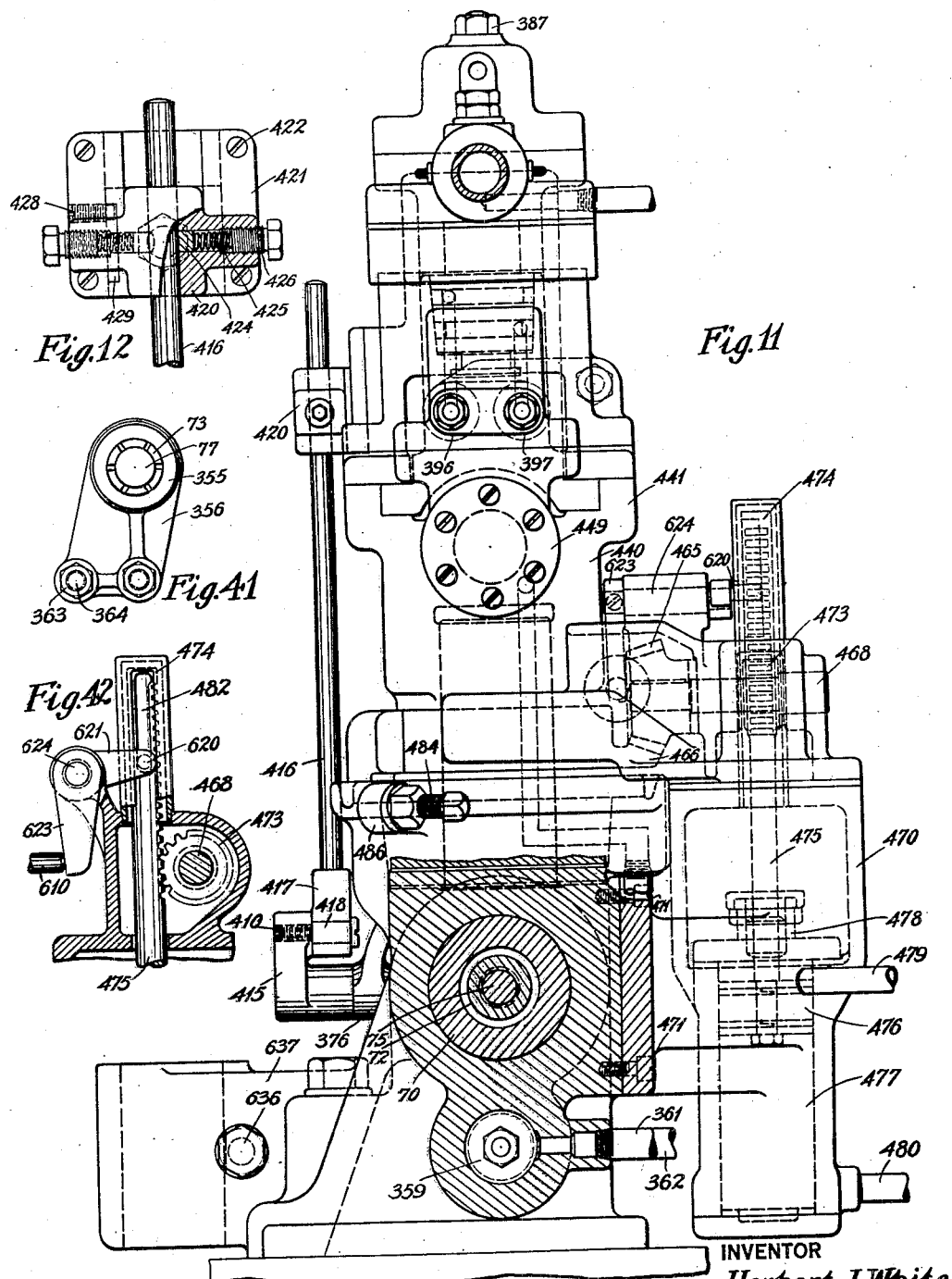

Dec. 30, 1930.　　　　H. J. WHITE　　　　1,786,689
COMPLETELY AUTOMATIC GEAR CUTTING MACHINE
Filed Dec. 13, 1928　　12 Sheets-Sheet 6
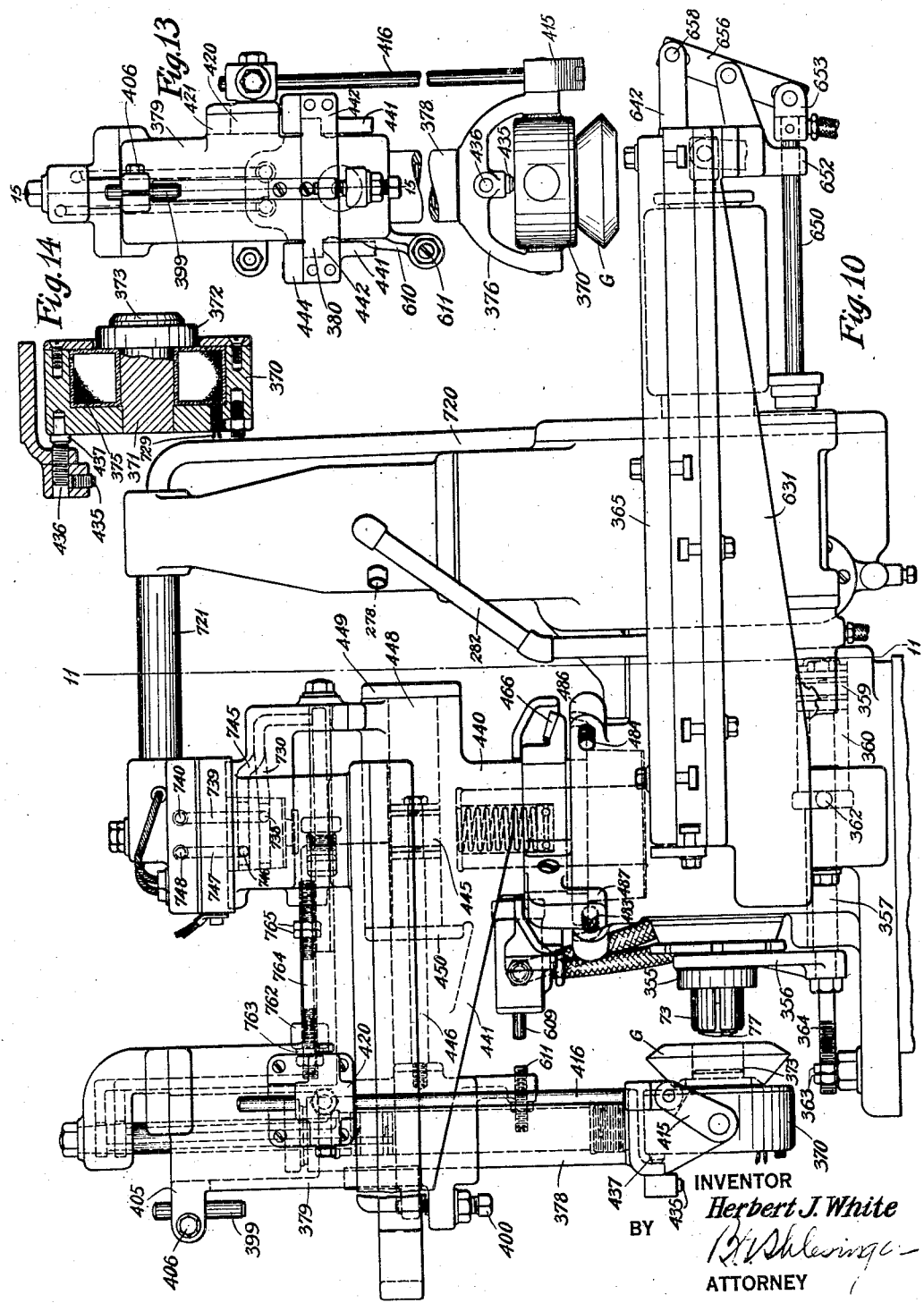
INVENTOR
Herbert J. White
BY
ATTORNEY

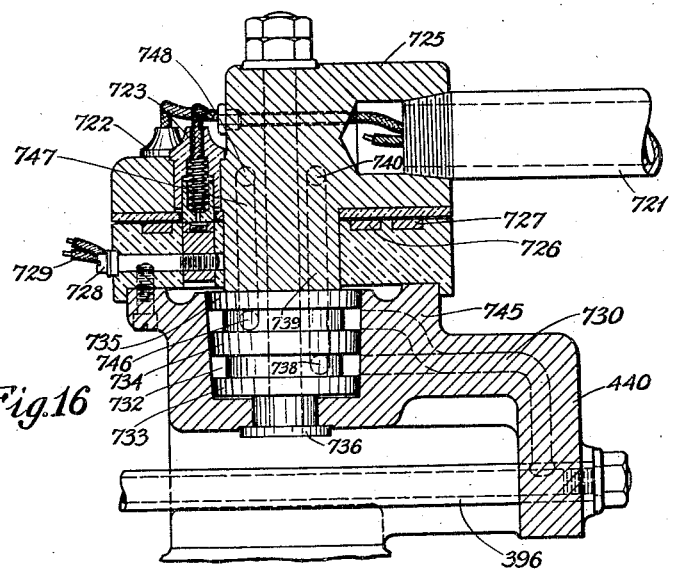

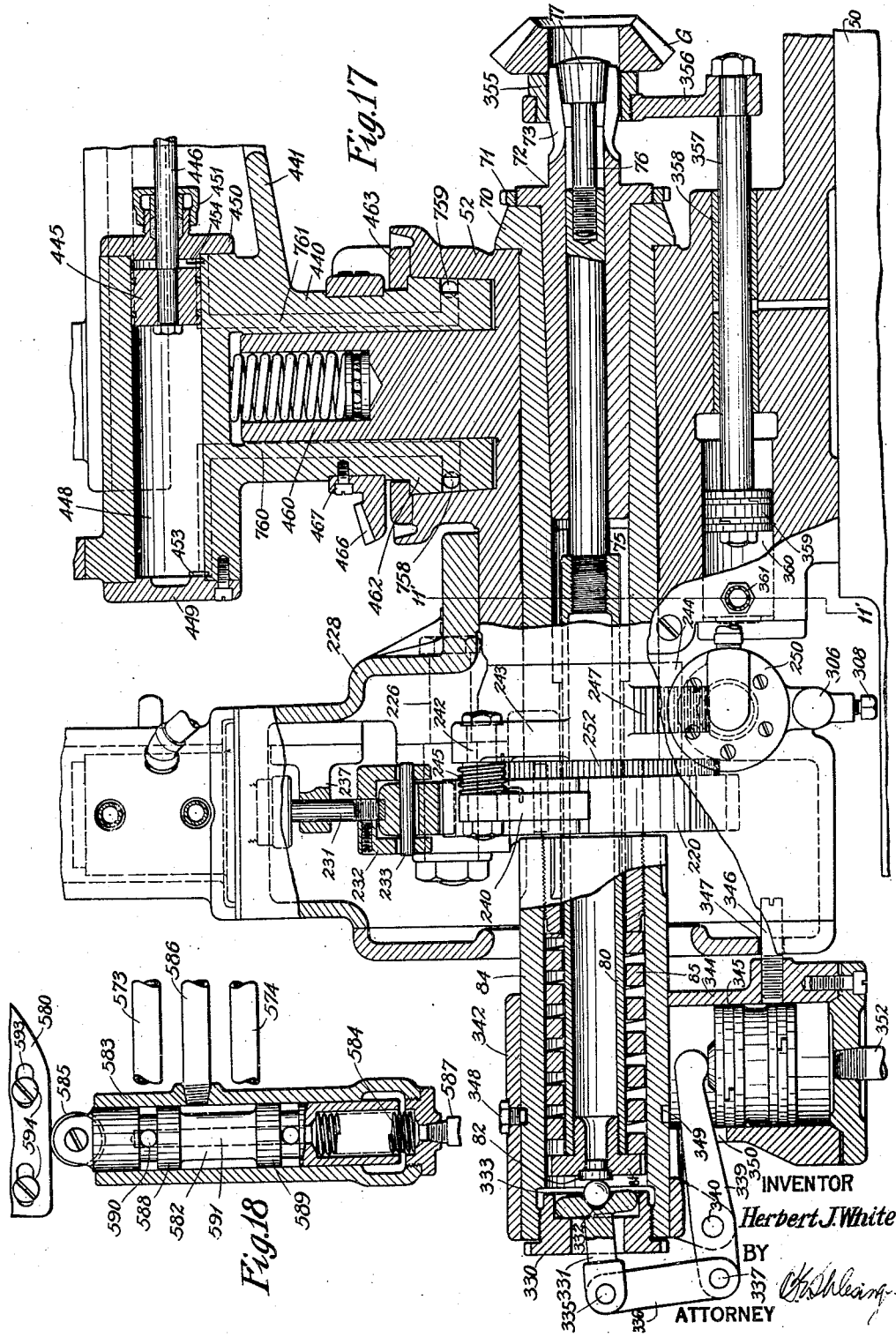

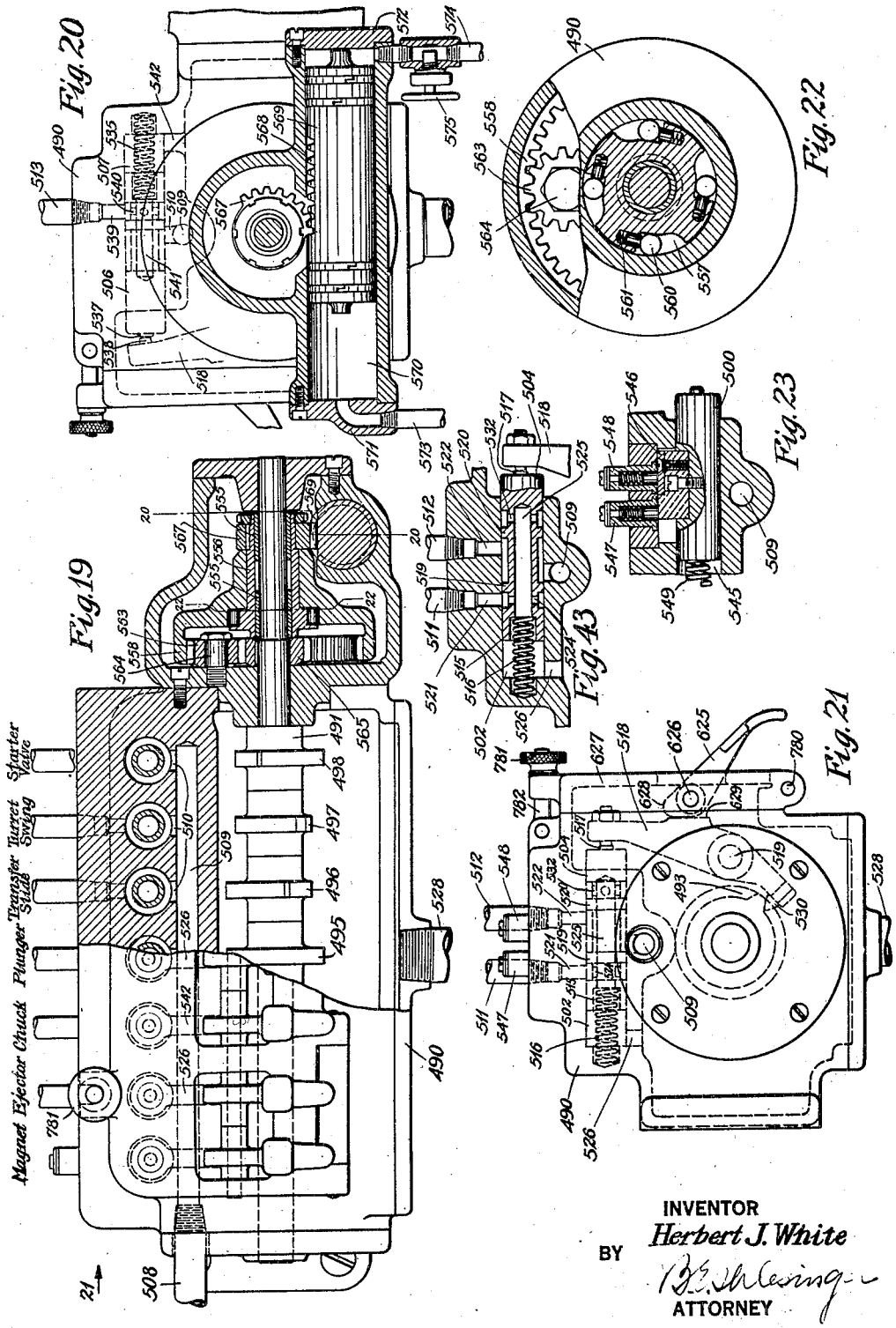

Dec. 30, 1930.   H. J. WHITE   1,786,689
COMPLETELY AUTOMATIC GEAR CUTTING MACHINE
Filed Dec. 13, 1928   12 Sheets-Sheet 10
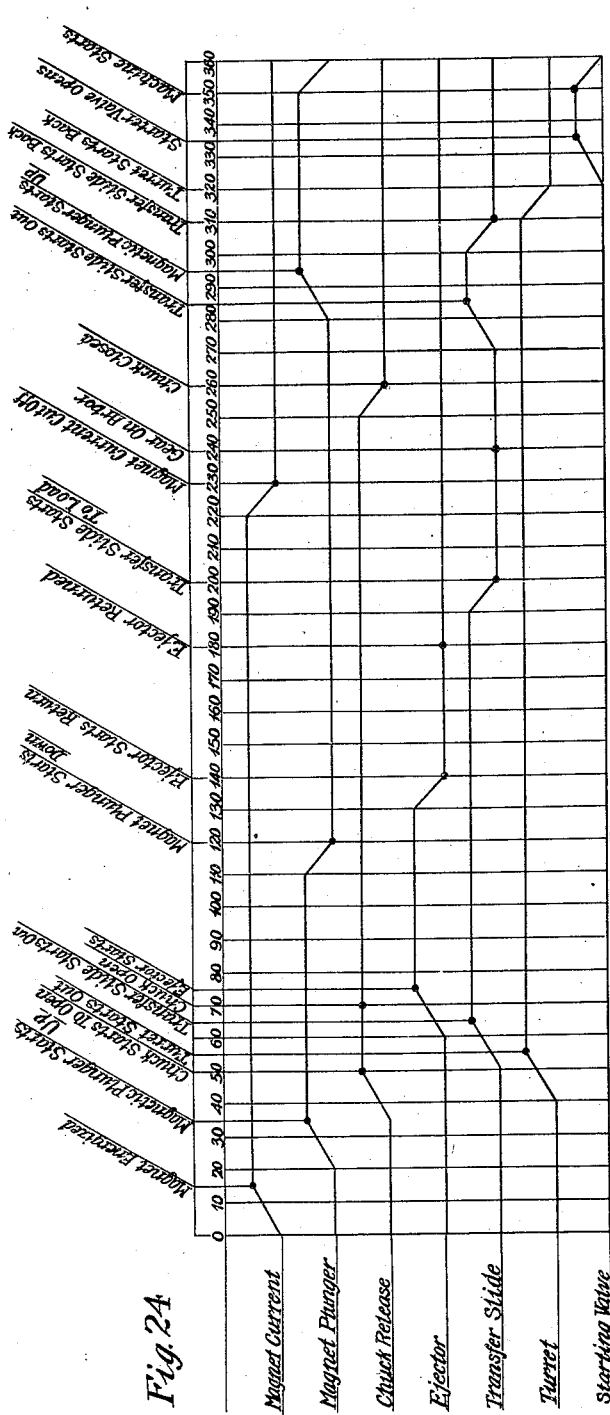
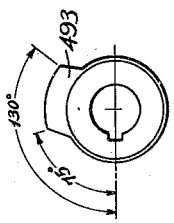
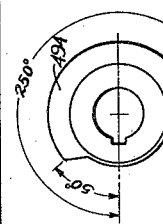
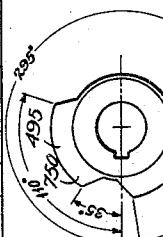
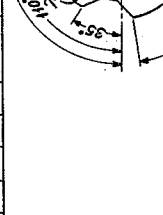
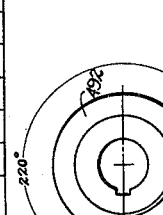
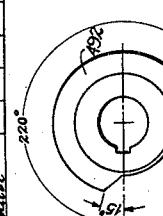
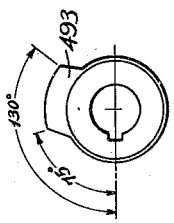
INVENTOR
Herbert J. White
BY
ATTORNEY Dec. 30, 1930.    H. J. WHITE    1,786,689
COMPLETELY AUTOMATIC GEAR CUTTING MACHINE
Filed Dec. 13, 1928    12 Sheets-Sheet 11
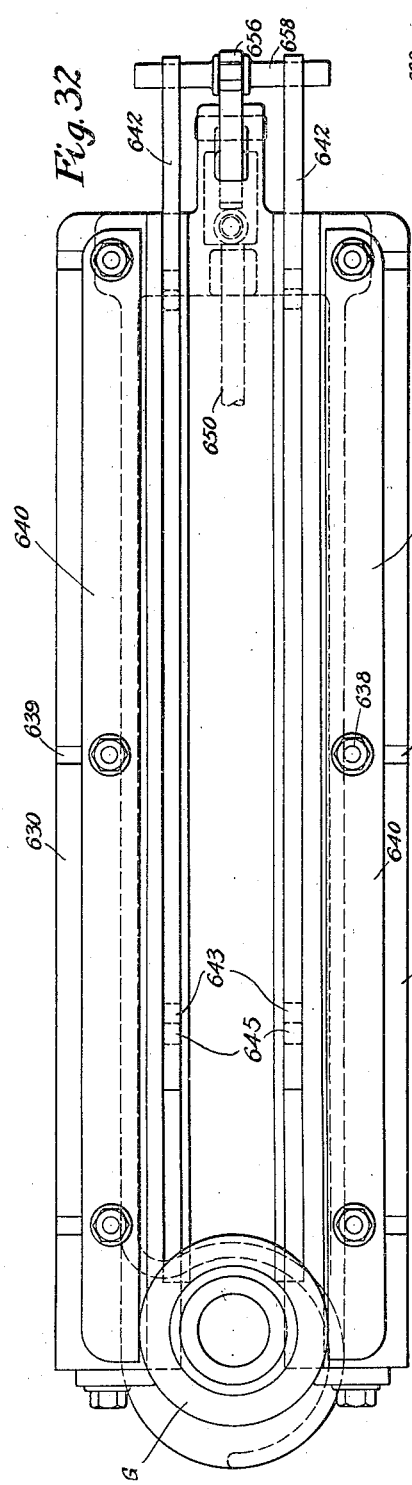
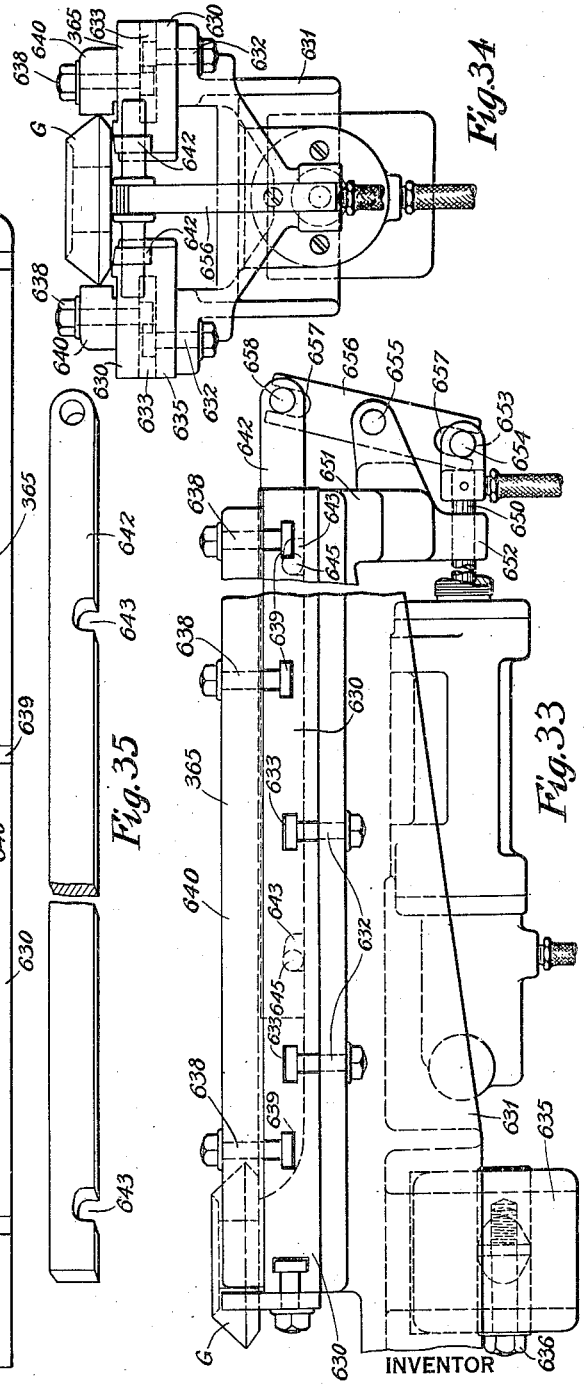
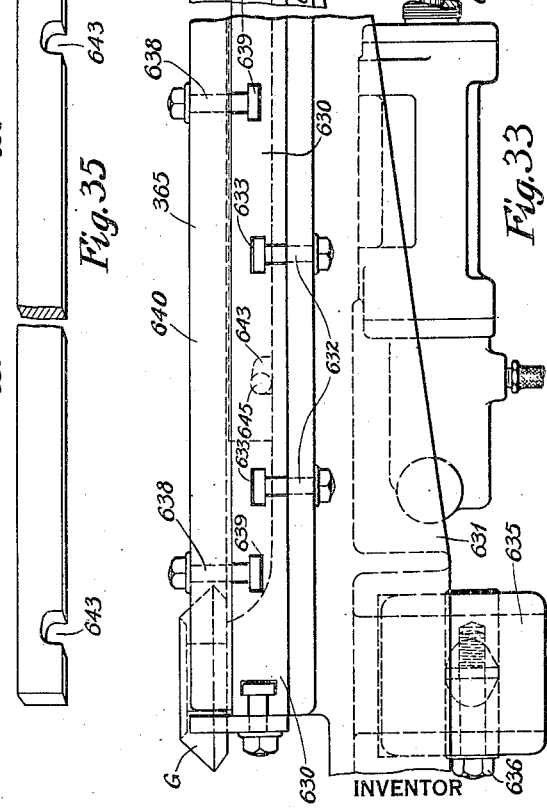
INVENTOR
Herbert J. White
BY
ATTORNEY

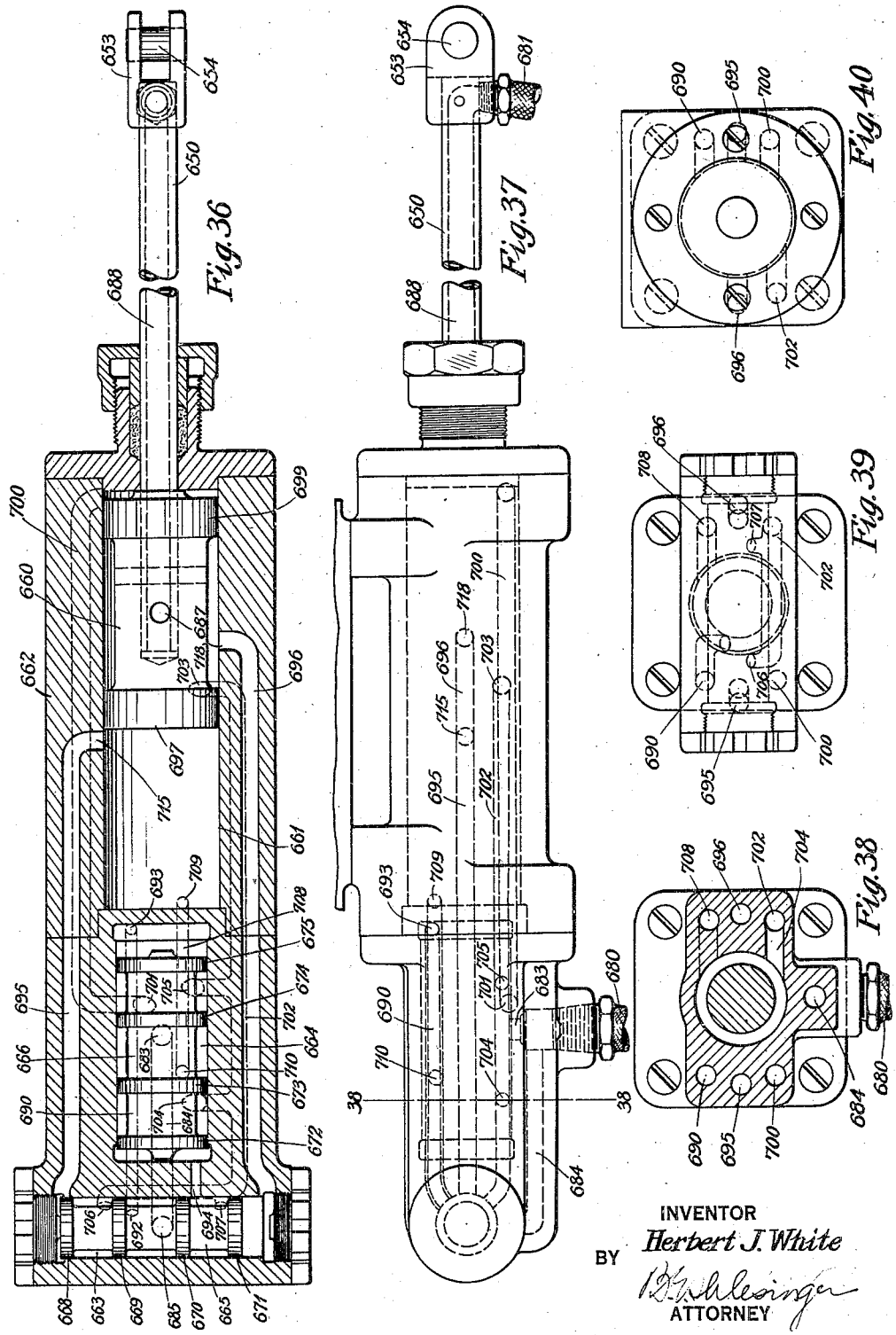

Patented Dec. 30, 1930

1,786,689

UNITED STATES PATENT OFFICE

HERBERT J. WHITE, OF ROCHESTER, NEW YORK, ASSIGNOR TO GLEASON WORKS, OF ROCHESTER, NEW YORK, A CORPORATION OF NEW YORK

COMPLETELY AUTOMATIC GEAR-CUTTING MACHINE

Application filed December 13, 1928. Serial No. 325,841.

The present invention relates in general to machine tools and more particularly to machines for producing gears.

The primary purpose of this invention is to provide a fully automatic gear cutting machine. To this end, the alternate feeding and indexing operations are effected automatically as usual and in addition after the cutting operations upon the work have been completed, the work is automatically withdrawn from engagement with the tool a sufficient distance to permit removal of the work piece without interference with the cutter, then the completed work piece is ejected from the work spindle and a new blank is automatically picked up from a magazine on the machine, automatically loaded on the work spindle and automatically chucked. The work spindle is then automatically returned into operative relation with the cutter for the cutting of the new blank.

As a complement of the primary purpose of the invention, means is provided whereby the automatic movement of withdrawal of the work from the tool after the cutting operation has been completed sets the loading mechanism into operation and whereby the loading mechanism in turn trips off the mechanism for returning the work into operative relation with the tool after a new blank has been chucked.

As a further feature of this invention, a safety device is provided which prevents return of the work spindle into operative relation with the tool until the new blank has been properly chucked.

Other features of this invention include the magazine for holding the blanks and the mechanism for moving the blanks forward constantly in the magazine.

The invention further provides a full automatic transfer or loading apparatus, simple in construction and positive in operation, for transferring blanks from the magazine and loading them onto the work spindle.

The invention provides, also, an improved form of automatic chuck release and an automatic work ejecting mechanism.

A further purpose of this invention is to provide a mechanism of a simple character for automatically varying the speed of the feed of the work into the cutter, so that as the cutter approaches its finish depth position a slow fine feed is obtained.

For the purpose of securing a simple, flexible and inexpensive mechanism for effecting the various operations of the machine, it is a further purpose of this invention to provide mechanism for effecting the above operations hydraulically.

Complementary to this fluid pressure operated mechanism, there is provided as an additional feature of this invention a valve control for the reciprocating part which obviates the use of a mechanical "help over" to reverse the direction of the reverse valve at either end of the stroke of the reciprocating part.

The invention provides further a mechanism which is controlled by the movement of the work support away from and toward the tool for accelerating this movement as the work support moves to chucking position and decelerating this movement as the work support returns into operative position.

A still further purpose of this invention is to provide a hydraulically operated indexing mechanism which will be positive in operation and of the highest degree of accuracy.

A still further purpose of this invention is to provide means for actuating the magazine which will be self-contained and in which the reversal of the piston in the cylinder is controlled by the movement of the piston itself.

The principal features and purposes of this invention have been referred to above. Other objects of the invention will be apparent hereinafter from the specification and from the recital of the appended claims.

One embodiment of the invention is illustrated in the accompanying drawings, in which:

Figure 1 is a side elevation, partly in section, of a gear cutting machine built according to one embodiment of this invention;

Figure 2 is a plan view, with certain of the parts broken away, of this machine;

Figure 3 is an end elevation, with parts broken away, of the base or frame of the machine;

Figure 4 is a view more or less diagrammatic, showing the structure of the hydraulically operated mechanism for reciprocating and for controlling the reciprocation of one of the work heads. This mechanism is identical for each of the four work heads with which the machine is provided;

Figure 5 is a detail view showing the limit stops and cooperating lug which control the length of the operating stroke of each work head;

Figure 8 is a side elevation of the index control valve and associated parts;

Figure 9 is a horizontal sectional view of this valve;

Figure 10 is a side elevation of an enlarged scale of one of the work heads showing the blank magazine and the loading mechanism;

Figure 11 is a rear elevation of the loading mechanism, a view such as might be had on the line 11—11 of Figure 10, omitting the magazine or on the line 11′—11′ of Figure 17;

Figure 12 is a detail view of the friction block controlling the swinging motion of the electro-magnet;

Figure 13 is a front elevational view of the loading mechanism;

Figure 14 is a view of the electro-magnet with parts broken away;

Figure 15 is a vertical section through a portion of the loading mechanism taken generally on the line 15—15 of the Figure 13;

Figure 16 is a vertical sectional view through a portion of the loading mechanism showing details of the commutator and swivel joint;

Figure 17 is a partial side elevation of the work head, parts being broken away to show the chuck operating mechanism, the ejector and details of the indexing mechanism and of the lower part of the loading mechanism;

Figure 18 is a detail view showing the valve and cam controlling the speed of movement of the work head to and from full withdrawn position;

Figure 19 is a side elevation, with parts broken away, of the valve bracket showing the mechanism for controlling the changing of work pieces at the loading station;

Figure 20 is a section through this casing taken on the line 20—20 of Figure 19;

Figure 21 is an end elevation of the casing looking in the direction of the arrow 21 in Figure 19;

Figure 22 is a section on the line 22—22 of Figure 19, parts being broken away to show details of the gear reduction for driving the cam shaft;

Figure 23 is a detail sectional view showing the sliding contact member controlling the operation of the electro-magnet;

Figure 24 is a lay-out illustrating diagrammatically the operation of the chucking, ejecting and loading mechanisms;

Figure 6:
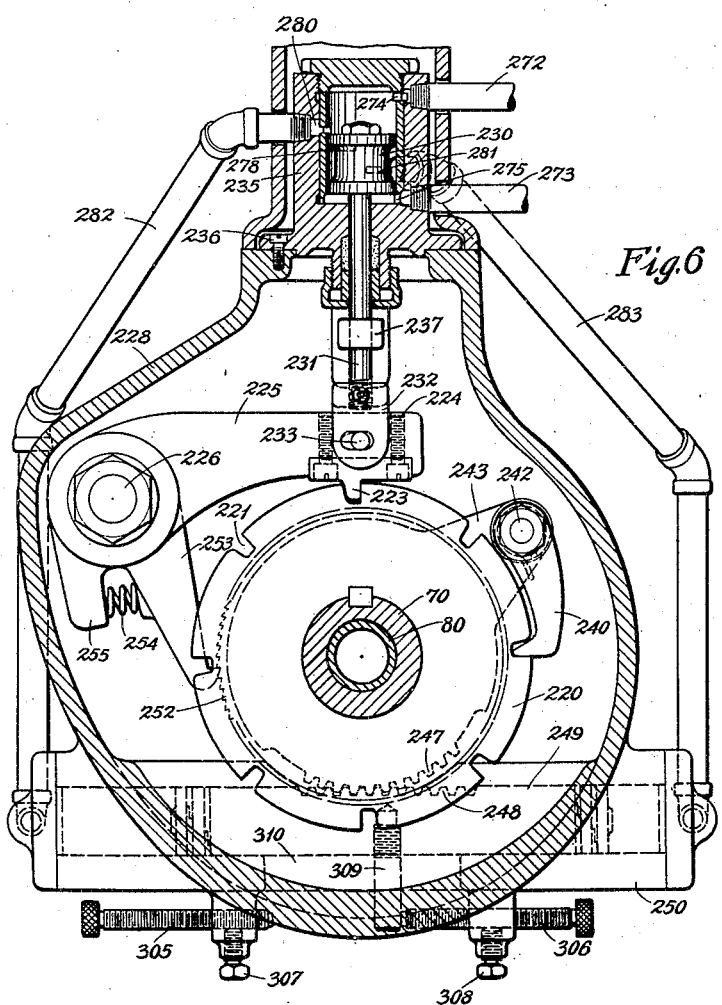
Figure 6 is a section through one of the work heads showing details of the indexing mechanism.

Figures 25 to 31 inclusive are detail views of the various cams controlling the times of operation of the chucking, ejecting and loading mechanisms;

Figures 32, 33 and 34 are a plan view, a side elevation, and an end elevation, respectively, of the work magazine;

Figure 35 is a perspective view of one of the bars for advancing the blanks in the magazine;

Figure 36 is a plan section and Figure 37 is a side elevation of the hydraulic engine for driving the feed bars and the magazine;

Figure 38 is a section on the line 38—38 of Figure 37;

Figure 39 is an end elevation looking at one end of the hydraulic engine and Figure 40 is an end elevation of the opposite end of this hydraulic engine;

Figure 41 is an end elevation showing a detail of the ejector mechanism;

Figure 42 is a detail view of a portion of the gearing for rotating the loading turret and showing, also, the mechanism for restoring the safety valve to its normal closed position; and Figure 43 is a partial transverse section through the valve casing shown in Fig. 19, showing details of one of the valves.

The present invention is illustrated as applied to a machine for roughing straight tooth bevel gears in which a centrally arranged disc cutter is employed as the cutting tool and in which there are disposed at intervals about this cutter a plurality of work supports each carrying a gear blank adapted to be operated upon by the cutter. A machine of this character is, described in the patent to James E. Gleason et al., No. 1,344,879 of June 29, 1920 and the machine herein illustrated may be considered as an improvement upon the machine illustrated in that patent. In a rougher such as shown, the work heads are moved, each of them, alternately toward and from the cutter for feeding and indexing. In the present machine, in addition, when a blank has been completely roughed out, the work head carrying it is automatically moved clear away from the cutter and through an automatic mechanism, the completed blank is released, and ejected, a new blank taken from the magazine, loaded on the work spindle, chucked and then the work head is returned into cutting position for the cutting of this new blank. The various work heads operate independently of each other and if, for any reason, the loading mechanism of one work head does not function properly, that work head is held in loading position without affecting the operation of the other work heads. The automatic movement of each work head to loading position after the blank carried thereby has been completely roughed out is controlled, in each case, by an automatic control device governed by the number of teeth to be cut in each blank. While this invention is described in connection with a particular form of roughing machine, it will be understood that it is not restricted to this form of rougher or in fact to roughing machines but has a wide application to all forms of machines for producing gears.

Referring now to the drawings by numerals of reference, 40 indicates the base or frame of the machine shown. Journaled centrally in suitable bearings in this base or frame 40 is a cutter spindle 41. Secured to the upper end of the cutter spindle is a head 42 and secured to this head 42 in any suitable manner as by bolts 43 is a cutter head 44 to which is fastened, as by screws 45, the plurality of cutting blades 46 constituting with the head, the disc milling cutter 47.

Mounted on the base or frame 40 of the machine are a plurality of slides 50 adapted to carry the several work heads. These slides 50 are disposed on the circular base 40 about the cutter, as clearly shown in Figure 2. The several work heads 52 are mounted on their respective slides 50 for angular adjustment thereon, as shown in Figure 2, in order to position the work heads at the correct angles for cutting the various several gear blanks G. This angular adjustment of the work heads is effected by swinging each on its slide 50 manually or by a suitable hand operated adjusting device. When each has been adjusted into the correct position for cutting the gear blank carried thereby, each work head may be secured in that adjusted position by the T-bolts 54 which engage in the arcuate T-slots 55 formed in the respective slides 50. Through this angular adjustment, the work heads may be positioned, all of them, for cutting gears of the same pitch cone angle, or each work head may have a different angular adjustment so as to permit cutting gears of different pitch cone angles, simultaneously on the four work heads.

The milling cutter 47 is rotated continuously during the operation of the machine from a motor 60 mounted in the base of the machine (Fig. 2) through the bevel gearing 61, 62 (Figs. 1 and 2), the shaft 63, the spur pinion 64, and the internal gear 65 which is secured to the cutter spindle head 42 by means of bolts 66.

The several work heads, chucking mechanisms, ejectors, indexing mechanisms, loading mechanisms and mechanisms for operating the work heads are identical and in the specification hereinafter only one unit will be described specifically.

Journaled in each work head 52 is a work spindle 70 shown most clearly in Figure 17. Secured within the bore of this spindle 70, is an arbor 72 provided with a plurality of expansible gripping fingers 73. These fingers are adapted to be expanded within the bore of the gear blank G to be cut in order to secure this blank upon the arbor and work spindle. For expanding the fingers 73, a draw rod 75 is employed which has a headed portion 76 that is provided with a tapered head 77 for expanding the gripping fingers 73. The draw rod is secured at its inner end to a hollow sleeve 80. Threaded into one end of the bore of this hollow sleeve 80 is a head 81 which is provided with a wear plate 82, the purpose of which will appear hereinafter. The inner end of the sleeve 70 is of reduced diameter and on it is threaded a sleeve 84. Housed in the sleeve 84 and interposed between the opposed faces of the sleeve 70 and the head 81 is a coil spring 85. This spring is of sufficient strength to urge the draw rod 75 constantly into chucking position where the taper head 77 will expand the fingers 73 and clamp the gear blank G rigidly on the arbor 72.

A nut 71 which threads onto the arbor 72 is used for forcing the arbor out of the bore of the work spindle 70 whenever it is desired to remove the arbor from the work spindle.

In cutting each gear, the corresponding work head is alternately fed toward the cutter and withdrawn therefrom. On the feed movement, a tooth space is cut in the blank and on the withdrawal motion, the blank is indexed. This alternate feed and withdrawal motion is effected by reciprocating movement of the slides 50. The mechanism for reciprocating the slides 50 includes, in each case, a cylinder 90 (Figs. 1 and 4) which is secured in the base 40 of the machine. Reciprocable in each of the cylinders 90 is a piston 91 and to each piston 91 is secured a piston rod 92. The several piston rods pass through suitable packings 93 provided in one end wall of each cylinder 90.

Each piston rod 92 is secured at its outer end to a cross-head 94. Each cross-head 94 is provided with a vertical slot 95 within which is slidable a block 96. Each block 96 carries a pivot pin 97 (Figs. 1 and 3). Journaled on this pivot pin 97 at each side of the block 96 is a pair of arms 99. Journaled on the pivot pin 97 and straddling the arms 99 are a pair of arms 100. The arms 99 and 100 constitute a toggle, the purpose and function of which will appear more clearly hereinafter.

The arms 100 are parts of the same member 101 which is secured to a pivot pin 102 which is journaled in suitable bearings 103 in the frame or base 40 of the machine. The arms 99 are secured at their upper ends to a pivot pin 105 to which is secured one arm of a bell-crank lever 106. This bell-crank 106 is keyed to a spindle 108 which is journaled in suitable bearings 109 in the base or frame 40 of the machine. At its opposite ends, this bell crank lever 106 is connected to a pin 110 to which is secured a pair of arms 111. These arms 111 are connected by a pin 113 with a block 114, one of which is adjustably secured to each work head slide 50 by means of a screw 115. Adjustment of the screw 115 permits of cutting gears having teeth of different tapering depth. A graduated dial 117 may be provided for enabling this adjustment to be accurately and quickly made.

From the preceding description, it will be clear that as the piston 91 reciprocates back and forth in the cylinder 90, the work head slide 50 and the work head 52 connected thereto will be reciprocated toward and from the cutter 47 through the cross-head 94, the toggle members 99 and 100, the bell crank 106, the link 111 and the block 114.

In the movement of the work head slide and work head toward the cutter, a tooth space is cut in the gear blank carried by the work head while the movement of the work head slide and work head away from the cutter is utilized for indexing the blank from one tooth space to another to permit of cutting all the tooth spaces of the blank in successive feeding movements of the work head. Through the toggle linkage a feature of the present invention, the feed of the work head slide is decreased as the work moves into full depth cutting position so that through the toggle linkage, a slow, fine feed is imparted to the blank as it approaches finish depth position avoiding undue load on the cutter and insuring uniformity of depth of the cut.

The extent of the reciprocating movement of each work head for feeding and indexing is controlled by a pair of stop lugs 120 and 121 (Figs. 1 and 5). One of these lugs 120 is fixedly secured to and the other lug 121 adjustably secured to a slide 122 which is slidably mounted in ways formed in the base or frame 40 of the machine as clearly shown in Figure 3 and held therein by the upper and lower plates 124, as shown in Figures 1, 3 and 5. The plates 124 are secured to the base or frame by means of screws 125.

The lug or tappet slide 122 is connected by a stud 126 (Fig. 3) with the cross head 94 so that as the cross-head reciprocates back and forth under actuation of the piston 91 and piston rod 92, the corresponding tappet slide 122 is moved back and forth. The lugs or tappets 120 and 121 are adapted to engage an arm 127 which is secured by a setscrew 128 (Figure 5) to a sleeve 129 which is oscillatably mounted on the piston rod 130 of an auxiliary valve 131 (Figs. 4 and 5) for a purpose to be hereinafter described. The sleeve 129 is held against axial movement relative to the piston rod 130 by shoulders formed on the rod as clearly shown in Fig. 5.

The valve 131 is enclosed in a casing 132 (Figs. 1 and 4) which is secured to the base or frame 40 of the machine. The valve 131 is simply an auxiliary to the main reversing valve 135 (Figs. 1 and 4). The valve 131 controls the movement of this main reversing valve 135 and takes the place of the mechanical "help-over" which would otherwise be required to shift the main reversing valve 135 quickly from one position to another at opposite ends of the work head slide stroke.

The oil or other power fluid employed is pumped from a sump 140 (Fig. 4) in the base of the machine through a pipe 141 by means of a fluid pump 142 of any usual or suitable construction. The fluid is forced by the pump 142 into the main line 144. The valve casing 132 is connected with this main line 144 in any suitable manner as by the T-elbow 145 and the pipe 146. The fluid is exhausted from the casing 132 back to the sump 140 by means of a pipe 147. A feed control valve 150 is interposed in the main line 144 for a purpose to be hereinafter more particularly described. The portion 144' of the main supply line beyond the feed control valve 150 is connected at two points through the T-joint 152 and the elbow 153, respectively, with the casing 155 housing the main reverse valve 135. The casings of each of the main reverse valves 135 are secured to the corresponding cylinders 90. Ducts 157 and 158 connect each valve casing 155 with the corresponding cylinder 90 to admit fluid pressure to opposite ends of the piston 91 travelling in the cylinder. The auxiliary valve casing 132 is connected through the opening 160 and the piping 161 with one end of the reverse valve casing 155 and is connected through the opening 162 and the piping 163 with the opposite end of this casing 155. The main reverse valve casing 155 is connected through the opening 165 and the piping 166 to the sump 140. This opening 165 and piping 166 permits the fluid to exhaust from the cylinder 90 and the valve chamber 155 back to the sump. If desired, a check valve 168 may be interposed in the exhaust piping 166 as shown. For this purpose, a valve casing 169 is threaded on one end of the piping 166. This casing 169 houses the sliding check valve 168 which is continually urged to a closed position by the spring 170 the loading of which creates a back pressure on the operating piston 91 for the purpose of creating a differential in pressures on both sides of the piston which minimizes possibility of vibration or back lash in the operating mechanism. The load on this valve may be varied by the set screw 171. The casing 169 is provided with an opening 172 communicating with the sump.

The principal valves used in the machine are of the balanced cylindrical type which can be moved with a minimum of power regardless of the pressure employed.

The auxiliary valve 131 is bored for the greater portion of its length as indicated by the dotted lines 175 in Figure 4. Holes 176 and 177, respectively, in the valve 131 afford a communication between this bore 175 and the casing 132.

The main reverse valve 135 is likewise bored for the greater portion of its length as indicated at 180. A series of peripheral holes in the valve 135 afford communication between the bore 180 and the valve casing 155 at three separate points as indicated at 181, 182 and 183 respectively. The valve 131 is formed with three collars 185, 186 and 187, respectively, which serve as guide surfaces for the valve and to close the various openings 160, 162 and 188, the latter communicating with the supply pipe 146. The valve 135 is provided with five collars 190, 191, 192, 193 and 194, respectively, which act as guide surfaces and to control the various openings 157, 158, 165, 196 and 197, the two latter openings communicating with the supply pipe 144' through the T 152 and the elbow 153 respectively.

The position of the speed control or throttle valve 150 already referred to, is controlled by the movement of the corresponding work head. Secured to each work head is a cam 200 (Figs. 1 and 4). This cam 200 may be pivoted, as shown, at one end, as at 201, to a bracket 202 which is secured to the work head by means of the screws 203. At its opposite end, the cam member 200 is provided with an arcuate slot concentric with the pivot pin 201 and can be held in any adjusted position on the head by means of a bolt 204 which passes through this slot 205. Secured to the casing 207 housing the throttle valve 150 is an arm 208. Pivoted to this arm 208 is a lever 209 which carries a roller 210 that is adapted to engage the cam surface of the cam 200. A spring 212 housed in the valve casing 207 serves to constantly urge the valve 150 into full open position to allow the fluid to flow freely from the main pipe 144 through the valve into the branch portion 144' of the main pipe. The valve 150 carries at its upper end a roller 214 which is held in engagement with the lever arm 209 by the spring 212.

The shape of the cam will be determined from the characteristics of the gear to be cut. During the stroke of the work head for feeding and indexing, the cam 200 is moved back and forth over the roller 210. The cam will be so constructed that the length of travel of the work head for feeding and indexing is equal to or less than the distance between the two noses or projections, 215 and 216 formed on the surface of the cam. When the head is moved clear away from the cutter, as required for taking off the completed work piece and chucking a new blank, the cam will ride clear of the roller 210 as will be described more particularly hereinafter. We are at present concerned simply with what takes place during the feeding and indexing movements of the several work heads.

The reciprocating movement of the work head is effected through movement of the piston 91, the cross-head 94, the toggles and linkage already described. As already described, each cross head 94 has connected to it a tappet slide 122 which carries the two lugs or tappets 120 and 121. At opposite ends of the stroke of the piston 91 and cross head 94, then, one or the other tappet 120 or 121 will strike the arm 127 (Figs. 1 and 5) mounted on the piston rod 130 and shift the auxiliary valve 131 longitudinally in its casing 132. In the position shown in Figure 4, the opening 162 of the valve casing 132 is on supply and the opening 160 on exhaust. In this position, the power fluid passes from the supply pipe 144 through the pipe 146 and opening 188 into the casing 132, then through the opening 162 and pipe 163 into the main reverse valve casing 155. At the same time, oil is exhausted from the opposite end of the main reverse valve 135 by the piping 161, the opening 160, the bore 175 of the valve 131 through the openings 177 of this valve to the pipe 147 and thence back to the sump. The oil supplied to the valve casing 165 from the pipe 163 acts to move the valve 135 in the casing. In the position shown in Figure 4, the supply is cut off at the opening 196 by the collar 191 and the supply is through the elbow 153, the opening 197, and the duct 158 into the cylinder 90 at the right end of the piston 91, thus moving the piston 91 from right to left in this figure. Oil is exhausted from the opposite end of the piston 91 through the duct 157, the openings 181 in the valve 135, the bore 180 of this valve, the openings 182 in this valve, the opening 165 in the valve casing 155 and the pipe 166 back to the sump.

When the valve 131 is shifted by the movement of the tappet slide 122 as already described, this valve passes through neutral position in which the collars 186 and 187 close both ports 160 and 162 to the opposite position from that shown in Fig. 4 in which the opening 160 is on supply and the port 162 on exhaust. Through this shift of the auxiliary valve 131, the main reverse valve 135 is shifted. It passes through neutral position in which the collars 191 and 194 close both ducts 157 and 158 to a position opposite to that shown in Fig. 4, in which the supply is through the T 152, opening 196, and duct 157 to the left hand end of the piston 91 thus driving the piston 91 from left to right in the cylinder 90 and reversing the work head. The oil at the right hand end of the piston cylinder 90 exhausts then through the duct 158, the openings 183 in the valve 135, the bore 180 of this valve, the openings 182 of the valve, the opening 165, and the pipe 166 to the sump. It will be clear, therefore, that the reciprocating movement of each work head is controlled from that particular work head through the corresponding auxiliary valve 131. It will be understood, of course, that the lug 121 is adjusted for the length of stroke desired on the work head. The cam 200 acts as an auxiliary to the toggles 99 and 100 for controlling the feed movement of the work head and for accelerating the reverse movement of each work head for indexing, the lever 209 and the valve 150 being depressed more or less according to the contour of the cam to throttle more or less the supply from the main pipe 144 through the valve 150 to the branch 144' of the pipe.

The main pipe 144 may be divided into four separate branches communicating with each of the four work heads or four separate pumps 142 may be provided one for each work head and each work head have a complete hydraulic system.

As has already been described, when the work head moves in toward the cutter, a tooth space is cut on the blank, and when the work head is moved away from the cutter, the blank is indexed. The indexing mechanism will now be described.

Keyed to each of the work spindles is an index plate 220 (Figs. 6 and 17). Each of the index plates 220 is provided with a number of notches 221 corresponding to the number of teeth to be cut in the gear blank mounted on the work spindle. During cutting, the work spindle 70 is locked against rotation in its bearings in the work head 52 by means of a locking dog 223 which engages one of the notches 221 of the index plate 220. The locking dog 223 is secured by means of screws 224 to a lever arm 225 which is pivoted on a stud 226 and is mounted in the casing or guard 228 housing the index mechanism. The locking dog is engaged with and disengaged from the index plate 220 by the movement of a piston 230 which is connected with the arm 225 by the piston rod 231, the U-piece 232 and a pin 233. When the piston 230 moves upward in its cylinder 235, the locking dog 223 is withdrawn from engagement with the index plate and when the piston moves downwardly it is re-engaged with the index plate. The cylinder 235 in which the piston 230 moves is secured to the upper end of the guard or housing 228 by means of screws 236. The piston rod 231 is guided in its up and down movement by the bracket 237 which is secured to the guard 228 and is bored for the passage of the piston rod therethrough.

When the dog 223 is disengaged from the indexing plate 220 through the mechanism which will hereinafter be more particularly described, the work spindle 70 is rotated through an angle corresponding to the distance between two successive teeth of the blank to position the next tooth space of the blank in position for cutting on the succeeding feed movement of the work head. For rotating the work spindle 70 to accomplish this indexing movement, a pawl 240 is provided. This pawl 240 is mounted upon a stud 242 which is secured to the arm 243 of a member 244 which is journaled on the spindle 70. A coil spring 245, one end of which engages the arm 243 and the other end of which engages the pawl 240 serves to urge the pawl 240 constantly into a position of engagement with the notched plate 220.

The member 244 is toothed for a portion of its periphery to form a gear segment 247. Meshing with this segment 247 is a rack member 248 which is formed integral with a piston 249. This piston 249 is reciprocable in a cylinder 250 which is formed as part of the index casing or guard 228.

When the dog 223 has been disengaged from the index plate 220, the member 244 can be rotated by movement of the piston 249 from right to left in Fig. 6 to rotate the index plate 220 through engagement of the pawl 240 with one notch thereof to bring a new notch of the plate into position for engagement by the dog 223 thereby indexing the blank. When this is done the locking dog 223 is re-engaged with the index plate entering the new notch and the piston 249 is reversed rotating the member 244 back to the angle to which it had previously advanced causing the pawl 240 to ratchet back over the index plate without moving the same.

To prevent any reverse movement of the index plate while the locking dog 223 is disengaged for indexing, a pawl and ratchet wheel are provided. The ratchet wheel 252 is secured to the index plate 220. The pawl 253 is mounted on the pivot pin 226. A coil spring 254 is interposed between a tail-piece 255 formed on the locking dog lever 225 and the pawl 253. Movement of the locking dog 223 to disengaged position serves to securely engage the ratchet pawl 253 with the ratchet wheel 252. This prevents any reverse movement of the work spindle while at the same time, allowing of the advance movement of the spindle through engagement of the pawl 240 with the notched plate 220.

Figure 7:
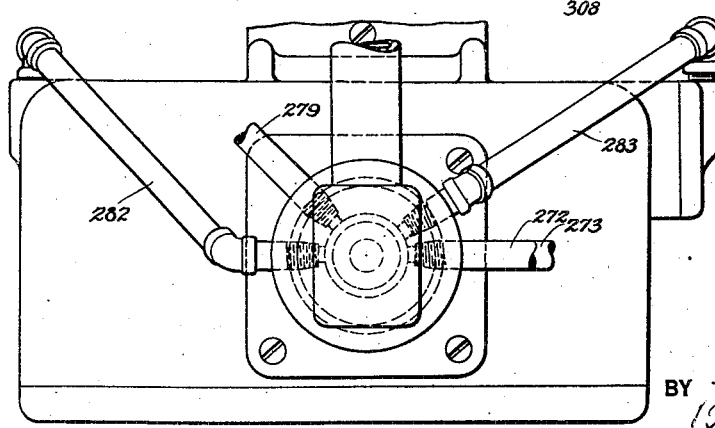
Figure 7 is a partial plan view of a work head showing the index end of the same.

The indexing apparatus is controlled and tripped off in each case by a valve 260 which reciprocates in a casing 261 (Figs. 1, 8 and 9) secured to the work head slide 50. The valve casing 261 is connected by a pipe 263 with the main supply pipe 244 and by a pipe 264 in any suitable manner with the exhaust piping running back to the sump. The exhaust pipe 264 communicates with the valve casing through the opening 265. The supply pipe 263 opens into a bore 266 which opens at two spaced points 267 and 268 into the valve casing. The valve casing 261 communicates through openings 270 and 271, respectively, with pipes 272 and 273. The pipes 272 and 273, see Figs. 1, 6 and 7, communicate through the openings 274 and 275, respectively, with the valve casing 235.

There is provided in the valve casing 235 an opening 278 which communicates through a pipe 279 with the permanent exhaust of the machine. The valve casing 235 is also provided with openings 280 and 281 which communicate, respectively, with the pipes 282 and 283. These pipes 282 and 283 are connected to the cylinder 250 to admit fluid pressure to opposite ends of the piston 249 which moves in that cylinder.

The valve 260 (Figs. 8 and 9) is provided with fixed collars or guides 285, 286, 287, 288, 289 and 290 which in the movement of the valve serve to control the various openings 270, 267, 268 and 271, provided in the valve casing 261. The valve 260 is provided with a bore or opening 292 extending the whole of its length. A spring 293 seated in a suitable recess provided in one end of the valve 260 and abutting the adjacent end wall of the cylinder 261 serves to urge the valve constantly in one direction. Secured to the valve at a point intermediate its length is a stud 295 which projects through a slot 296 provided in the valve casing 261.

Mounted on a pin 298 (Figs. 1 and 8) journaled in the frame or base of the machine is a tappet or lug 299. The purpose of the pivoted mounting of the lug 299 will appear hereinafter.

The lug 299 is so located on the base of the machine as to engage the stud 295 before the work head has reached the outer limit of its withdrawal movement. In the continued outward movement of the work head, the valve 260 is shifted by engagement of the stud 295 with the relatively stationary lug 299. Figures 8 and 9 show it as fully shifted at the end of the outward movement of the work head.

In the position shown in the drawings, the motive fluid passes from the supply pipe 263 through the bore 266 out of the opening 268 into the casing 261 thence through opening 271 to pipe 273. The supply through the branch 267 of the bore 266 is shut off from the opening 270 by the collar 286. The pipe 272 is on exhaust through the opening 270, a hole 300 provided in the valve, the bore 292 which communicates with this hole 300, the opening 265 and the exhaust pipe 264.

The supply of the fluid passing through the piping 273 enters the valve casing 235 (Figs. 6 and 7) through the opening 275. This forces the piston 230 upwardly in the valve cylinder 235, the oil above the piston exhausting at the same time from the opening 274 through the pipe 272 and thence through the valve casing 261 to the pump and exhaust pipe 264 as already described. As the piston 230 which acts, also, as a valve, moves upwardly in the chamber 235, the opening 281 and pipe 283 are opened to the supply of oil coming from the pipe 273. At the same time it puts the pipe 282 on exhaust through the opening 280 and the opening 278 communicating with the permanent exhaust pipe 279. The fluid flowing into the pipe 283 enters the cylinder 250 (Figs. 6 and 7) on the right hand end of the piston 249 and the fluid exhausting through the pipe 282 is taken from the left hand end of this cylinder 250 so that when the opening 281 has been opened to supply by the upward movement of the piston 230, the piston 249 is moved in the cylinder 250, thus rotating the work spindle 70 through the rack 248, the gear segment 247, the pawl 240 and the index plate 220. During this indexing rotation of the work spindle, the work spindle is held against reverse movement by the pawl 253 and the ratchet wheel 252.

At the end of its outward movement the work head slide 50 is reversed through engagement of the arm 127 by the lug 120 (Fig. 5). This occurs just as or before the stud 295 reaches the limit of its travel in the slot 296 of the valve casing 261 (Fig. 9). The work head then reverses. Immediately the valve 260 is moved from the position shown in Figures 8 and 9 by the spring 293. Pipe 272 is now put on supply and pipe 273 on exhaust. The piston 230 is thus forced downwardly in the cylinder 235. As it moves down, the pipe 282 is put on supply through the openings 280 and 274, the latter communicating with the pipe 272. At the same time, the pipe 283 is put on exhaust through the openings 281 and 278, the latter communicating with the permanent exhaust pipe 279. Thus, as the piston 230 moves downwardly, the piston 249 is reversed in the cylinder 250, returning the rack 248 and spur gear 247 to initial position, the pawl 240 ratcheting back over the index plate and the index plate being held against reverse movement by the pawl 253 and ratchet wheel 252. In the further downward movement of the piston 230, the locking dog 223 will be re-engaged with the index plate 220 in a new notch thereof to secure the blank in its new indexed position. The blank is held in this position until the stud 295 (Figs. 8 and 9) again strikes the lug 299 on the subsequent withdrawal of the work head.

By using the piston 230 as a valve in the manner described to control the movement of the piston 249 any possibility of turning the work spindle before the locking dog has been disengaged from the index plate or of trying to re-engage the locking dog with the index plate before the index movement has been completed is precluded.

For setting the piston 249 for varying strokes as required when indexing gears of different numbers of teeth, a pair of adjustable stops 305 and 306 (Fig. 6) are provided. These stops are threaded into projections formed on the index plate housing 228 and may be locked in any adjusted position by means of the set screws 307 and 308, respectively. The lugs 305 and 306 engage a stud 309 which is secured to the piston 249 and passes through a slot 310 provided in the cylinder 250.

Each work head is fed into the cutter and withdrawn alternately a number of times equal to the number of tooth spaces to be cut in the blank. On each feed movement a rod 315, one of which is secured to each cross head 94 (Fig. 1) strikes the arm of a lever 316 which is pivoted on the casing of an automatic control device 317. The control devices, there is one for each work head, may be of any usual or suitable construction. Those shown are of the construction illustrated in the patent to M. H. Hill, No. 1,577,121 of March 16, 1926. These control devices 317 are suitably mounted upon the base or frame 40 of the machine. The arm 316 is adapted to contact at its end opposite from that engaged by the rod 315 with a plunger 318 which is thereby reciprocated to advance the control device. The control device is set for a number of reciprocations of the plunger 318 corresponding to the number of teeth to be cut in the blank. On the final feed movement of the work head then, the control mechanism 317 is tripped. Tripping of the control device moves a link 320 upwardly (see Figs. 1 and 3). This link 320 is connected to one end of a lever 321 which is pivoted intermediate its length on a stud 322 secured in the frame and is pivotally connected at its opposite end to a pair of links 323 and 324. The link 324 is pivoted to an arm 325 (Figs. 3 and 5) which has a splined connection with the sleeve 129 to which is secured the arm 127. The link 323 is connected to a link 327 which is secured to the pin or rockshaft 298 to which the lug or tappet 299 (Fig. 8) is secured. The arm 127, as already described acts to shift the valve 131 (Fig. 4) and control the stroke of the work head by engagement with the tappets or lugs 120 and 121 (Fig. 5). The tappet or lug 299 acts to shift the index control valve 260 against the resistance of the spring 293 as already described. When on the final feed movement of the work head, then, the control device 317 is tripped, the tappet 299 is swung downwardly out of the way of the stud 295 (Figs. 8 and 9) and the arm 127 is swung upwardly out of the way of the tappet 120. On the subsequent withdrawal movement of the work head, then, both the tappet 299 and the arm 127 are in inoperative position and the work head consequently moves completely clear of the cutter and until it is stopped by the bottoming of the piston 91 in its cylinder 90. This position is shown at the right side of Fig. 1. The work head is now far enough from the cutter to permit removal of the completed gear and chucking of a new work piece. All these operations are effected automatically.

I shall now describe the chuck release. Threaded into the spring housing or casing 84 (Fig. 17) is a member 330 which forms a bearing for a mushroom-headed stem piece 331. This mushroom-headed piece 331 is provided with a recess 332 that forms a seat for a ball 333. The wear plate 82 which is secured in the end of the chuck draw-rod is held against said ball 333 by the spring 85. The arrangement is such that when the stem of the mushroom-headed member 331 is in alignment with the draw rod, the clamping fingers 73 are held in chucking position clamping the blank G securely upon the work arbor 72, and when the mushroom head is tilted at an angle to the axis of the draw rod, the draw rod is forced forward in the arbor against the resistance of the spring 85 allowing the fingers 73 to collapse, releasing the blank. The latter position is shown in Figure 17.

The means provided for rocking the tiltable head 331 will now be described. Connected to the outer end of the stem of the mushroom-headed member 331 by a pin 335 is a link 336. This link 336 is connected by a pin 337 with a lever arm 339. This lever arm 339 is pivoted intermediate its length, as at 340, to the casing or housing 342 which is provided with a sleeve portion surrounding the spring housing 84 and with a dependent portion 344 which houses a piston 345. The housing 342 is secured against rotational movement with the spring casing 84 by a set-screw 346 which is threaded into the depending portion 344 of the housing and enters an aperture 347 in the index guard or housing 228. The housing 342 is held against movement lengthwise on the spring casing 84 by a set screw 348 which enters a circular groove 349 formed in the periphery of the spring casing 84. The lever arm 339 passes through a slot 350 formed in the dependent portion 344 of the casing and its inner end is in position to be engaged by the piston 345.

The piston 345 is moved by fluid pressure, the fluid being admitted to and exhausted from the chamber formed by the depending portion 344 of the casing through the same pipe 352. As will be clear, when the fluid is pumped into the chamber, the piston 345 moves upwardly rocking the lever arm 339 about its pivot and rocking the mushroom-head 331 from a position of alignment with the draw rod 75 to the position shown in Figure 17 out of alignment therewith. As already described, this moves the taper head 77 to released position and permits collapse of the spring fingers 73 releasing the blank. When the oil is exhausted from the chamber 344, the piston 345 moves downwardly by gravity and by the action of the spring 85 acting through the mushroom head, link 336 and lever arm 339 and the draw rod returns to clamping position forcing the fingers 73 outwardly to engage and clamp the work on the arbor.

When the work has been completely cut and the work head has been moved clear away from the tool, the chuck is released by the upward movement of the piston 345 as just described. The present invention provides means which operate immediately after the release of the blank to eject or force the blank off the arbor. This means will now be described.

Each of the work heads carries an ejector consisting of a collar 355 (Fig. 17) which is secured to an arm 356 that is in turn secured to a piston rod 357. The piston rod 357 slides in suitable bearings 358 provided therefor in the work head. It is secured to a piston 359 which moves in a cylinder 360 formed by boring out the work head. The motive fluid is admitted to opposite ends of the piston 359 by pipes 361 and 362 (Figs. 11 and 17). While the blank is being cut, the collar 355 rests against the outer face of the arbor 72 as shown in Fig. 1 and the gear blank is held securely on the arbor by the spring fingers 73. After the blank has been cut and the work head has been moved clear of the blank, the piston 345 operates to release the fingers 73 and release the blank. Immediately thereafter the pipe 361 is put on supply and the pipe 362 on exhaust forcing the piston 359 forward in that cylinder, thus moving the collar 355 forward on the arbor 72 to push the gear blank off of the arbor. Figure 17 shows the completed gear blank G just about to drop off the arbor. When this has been done, the pipe 361 is put on exhaust and the pipe 362 on supply, moving the ejector collar to inoperative position so that the new blank may be forced on the arbor as will be hereinafter described. The extent of movement of the ejector can be adjusted by adjusting the nut 364 (Figs. 1, 10 and 41) which is threaded on a bolt 365 that is secured in the work head and slides through a hole drilled therefor in the ejector arm 356.

Having ejected the completed work piece, a new blank can be positioned on the arbor. In the present invention, the loading is done automatically. On each of the work heads is mounted a magazine which is adapted to hold a plurality of gear blanks and each of the work heads carries a loading mechanism which operates automatically to take a gear blank from the corresponding magazine and position it on the corresponding work arbor when the corresponding work head has been moved to full withdrawn position and the previously completed work piece has been ejected from the arbor.

The means for holding the gear blank during its transfer from the magazine to the work arbor is an electro-magnet 370 (Figs. 1, 10, 13 and 14). The core of this electro-magnet is indicated at 371 (Fig. 14) and it is provided with an enlarged head 372 adapted to engage the outer face of the gear blank and with a portion 373 of reduced diameter compared with the diameter of this head 372. This portion 373 of reduced diameter is adapted to enter the bore of the gear blank to hold the same more securely as it is being transferred from the magazine to the work arbor. The nose of this portion 373 is beveled to enable the reduced portion more readily to enter the bore of the gear blank and center itself therein. A coil of a plurality of turns of wire surrounds the core 371. This coil is designated at 375.

The electro-magnet 370 is pivotally mounted between the arms of a bifurcated member 376. The bifurcated member 376 is secured to the lower end of a vertically movable cylinder 378 (Figs. 1, 10, 13 and 15). The cylinder 378 reciprocates in a sleeve 379 which is formed integral with a horizontally sliding member 380 to which reference will be had hereinafter. The cylinder 378 houses a piston 382. The arrangement is such that the piston is stationary and the cylinder moves, the cylinder being guided in its movement by the sleeve 379 and the piston 382. A suitable packing, designated as a whole at 383 surrounds the piston rod 384 to prevent leakage from the cylinder along the piston rod. The piston rod is tapered at its upper end and enters a correspondingly tapered bore formed in the arm 386 which is integral with the sleeve 379 and slide 380. The piston rod is secured in this arm 386 by a nut 387 which threads onto the upper end of the piston rod.

The piston rod 384 is bored for the greater portion of its length at 388 and 389. The bore 389 has an opening at 390 above the piston 382 to admit fluid pressure to the upper end of the piston to move the cylinder 378 vertically upward. The bore 388 extends clear through the piston 382 to admit fluid pressure to the opposite end of the piston and move the cylinder 378 vertically downward. The bores 388 and 389 communicate at 392 and 393, respectively, with ducts 394 and 395 bored in the arm 386 and slide 380. The ducts 394 and 395 are clearly shown in Figure 15 Communicating with the ducts are a pair of pipes 396 and 397 which serve to conduct the motive fluid to and from the respective ducts.

The cylinder 378 is limited in its movement by a pair of lugs 399 and 400 (Fig. 15) which are adapted to engage, respectively, opposite ends of a hardened piece 401 which is carried by a bracket or lug 402 that is secured by screws 403 to the cylinder 378. One of the lugs 399 is fixed being held in a split clamp 405 formed integral with the sleeve 379 by a bolt 406. The other stop 400 is adjustable, being threaded into a lug 408 integral with the sleeve 379. A lock nut 409 serves to secure the stop 400 in any adjusted position. The sleeve 379 is slotted at 410 as clearly shown in Fig. 15 and the lug or bracket 402 extends through this slot. The vertical movement of the cylinder 378 is used to move the blank from the level of the magazine to the level of the work arbor. This vertical movement is also employed to rock the electro-magnet 370 from a horizontal to a vertical position to swing the blank from the horizontal position it occupies when in the magazine to the vertical position required in order to position it on the arbor. For this latter purpose, one of the pins by which the electro-magnet 370 is journaled in the bifurcated member 376 is elongated and to this elongated part is secured an arm 415 (Figs. 1, 10, 13, and 11). A rod 416, having an enlarged head 417 at its lower end is pivotally connected to this arm 415 by a stud 418. The rod 416 slides in a friction block 420 which in turn is slidable in a guide bracket 421 that is secured to the sleeve 379 by screws 422 (see also Fig. 12). The friction block 420 may be of any suitable construction. As shown, it includes a pair of friction pieces 424 which are held in engagement with the rod 416 by springs 425. The tension on the springs can be adjusted by the set-screws 426. The friction block 420 is limited in its sliding movement in the guide 421 by a set screw 428 which is threaded into the guide 421 and enters a slot 429 formed in one side of the friction block.

Figures 13 and 10 show the electro-magnet 370 in two different positions. Figure 13 shows the electro-magnet in the horizontal position which it occupies when taking a blank from the magazine and during the transfer movement which will be described more particularly hereinafter. Figure 10 shows the electro-magnet 370 in vertical position with the blank in position for forcing it on to the arbor. The swinging of the electro-magnet from the position shown in Fig. 13 to that shown in Fig. 10 is effected by the downward movement of the cylinder 378. During this downward movement, the rod 416 and friction block 420 move with the cylinder 378 until the end wall of the slot 429 in the friction block strikes the screw 428. Then, in the further downward movement of the cylinder 378 the rod 416 is held against movement by the friction pieces 424 thus swinging the electro-magnet 370 on its pivots in the bifurcated member 376. It will be clear that the reverse of this will take place when the cylinder 378 moves upwardly and the electro-magnet will then be swung from a vertical to a horizontal position.

Adjustable limit stops 435 and 436 (Figs. 10, 13, and 14) are provided in the bifurcated member 376 to limit the swinging movement of the electro-magnet 370 so that it will not swing past the true horizontal plane or the true vertical plane, respectively. These stops engage a stud 437 that is secured in the back of the electro-magnet.

The slide 380 in which the cylinder 378 slides is reciprocable horizontally on a swinging head 440 which is provided with arms 441 extending on either side of the slide 380 to form guide-ways 442, as clearly shown in Fig. 13, for the slide 380 in its horizontal movement. Side strips 444 serve to hold the slide 380 in position on the ways 442.

The slide 380 is reciprocated back and forth on the arms 441 by a piston 445 (Figs. 10 and 17) and a piston rod 446 which is secured at one end to the piston and at its opposite end is threaded into the sleeve 379 of the slide 380 (see Figs. 10 and 15). A lock-nut 447 serves to secure the piston rod to the sleeve 379.

The piston 445 travels in a cylinder 448 formed by a bore in the head 440 and by end plates 449 and 450 which close this bore. A suitable packing 451 is provided where the piston rod 446 passes through the end plate 450. Fluid pressure is admitted to opposite ends of the piston 445 through openings 453 and 454 provided in the side walls of the cylinder 448. It will be obvious that as the piston reciprocates back and forth in the cylinder 448, the slide 380 will be moved back and forth on the guide arms 441 of the head 440. This back and forth movement of the slide 380 is for the purpose of bringing the electro-magnet 370 into registration with the foremost blank in the magazine and for the purpose of moving the blank onto the work arbor after the electro-magnet has been brought into registration with the work arbor, all as will be more particularly described hereinafter.

The magazines 365, as clearly shown in Figure 2 are positioned at one side of their respective work heads and the electro-magnet must, consequently, be swung angularly from a position of registration with a magazine to a position of registration with the corresponding work arbor. Fig. 2 shows three of the loading mechanisms designated generally at A, B, C over the corresponding magazine 365 in position to take a blank off of the magazine. The fourth loading mechanism designated generally at D is in alignment with the corresponding work spindle having just loaded a new blank on this work spindle.

For its swinging transfer movement, the head 440 is journaled at its lower end upon a post 460 formed integral with the corresponding work head and it has an externally tapered foot portion 462 which is held in a correspondingly tapered bearing in the work head by a clamp plate 463 which projects over and engages a shoulder formed on the head 440 and is secured to the work head 52 (Fig. 17). At its upper end, the head or turret 440 is guided in its swinging movement by a stud or trunnion 736 (Figs. 10 and 16) which is relatively stationary and is received in a suitable recess formed in the upper end of the turret.

The head 440 is rotated back and forth between the magazine and the work spindle by a bevel pinion 465 (Fig. 11) which meshes with and drives a bevel gear segment 466 (Figs. 1, 10, 11 and 17). This bevel segment 466 is secured to the head 440 by screws 467. The pinion 465 is keyed to a shaft 468 which is journaled in a bracket 470 that is secured to the work head 52 at one side of the same by screws 471. Secured to the shaft 468 intermediate its ends (Fig. 11) is a spur pinion 473 (see also Fig. 42). This pinion meshes with a rack 474 that is secured to or formed integral with a piston rod 475. The piston rod 475 is secured at its lower end to a piston 476 which reciprocates in a cylinder 477 that is formed in the bracket 470. The suitable packing 478 prevents leakage from the cylinder 477 along the piston rod 475. Fluid pressure is admitted to opposite ends of the piston 476 through the pipes 479 and 480 and through this means, it will be seen that the rack 474 is reciprocated in the bracket 470 and that through its reciprocation it rotates the pinion 473 first in one direction and then in the other and that this rotation of the pinion 473 acts through the shaft 468 to rotate the pinion 465 first in one direction and then in the other to rotate the head 440, first in one direction and then in the other through the intermeshing engagement of the pinion 465 with the gear segment 466. Adjustable stops 483 and 484 (Figs. 10 and 11) are provided to limit the swinging movement of the head 440. These stops thread into lugs 486 formed integral with the work head 52 and engage a depending lug or projection 487 formed on the rotatable transfer head 440.

With the ejecting, chucking and loading mechanism described, the operation is as follows. Assuming the loading mechanism to be in the position indicated at A, B or C, Figure 2 with the electro-magnet over the blank in the magazine, the electro-magnet is energized picking up a blank from the magazine. The cylinder 378 (Figs. 10, 13 and 15) then starts upward clearing the blank of the magazine. At this time, the chucking mechanism is opened by tilting of the mushroom head 331 (Fig. 17) through upward movement of the piston 345. During the opening of the chuck, the turret head 440 starts to rotate under actuation of the piston 476 (Fig. 11) the rack 474, the pinion 473, the pinion 465 and the gear 466. As the turret rotates, the slide 380 (Figs. 13 and 15) starts out under actuation of the piston 445 and the piston rod 446. During this rotating movement of the turret 440, the chuck is opened and the ejector 356 is actuated to eject the already completed gear from the arbor (Fig. 17). The cylinder 378 then starts down to bring the new blank into registration with the work arbor. During its downward movement, the ejector 356 is returned to inoperative position. During the downward movement of the cylinder 378, the friction block 420 strikes the pin 428 and the electro-magnet 370 is swung on its pivot into a vertical position as shown in Figure 10. When the blank has reached a position of alignment with the arbor as determined by the stop 400, the slide 380 (Figs. 10, 11, 15 and 17) starts to move inwardly under actuation of the piston 445 and in its inward movement it pushes the gear blank on the arbor. The current to the electro-magnet 370 is then shut off. The fluid is then exhausted from the cylinder 344 (Fig. 17) with the result that the chucking mechanism firmly clamps the blank on the arbor. The slide 380 moves outwardly until it is clear of the work spindle, the cylinder 378 starts upward, the slide 380 then starts back and during its movement back, the turret head 440 is turned to bring the electro-magnet once more over the magazine. In the upward movement of the cylinder 378 the friction block strikes the pin 428 again and the electro-magnet is moved from its vertical position to the horizontal position it occupies when over the magazine.

All of these operations relating to chucking, ejecting and loading are performed automatically and the mechanism for controlling the same will now be described.

Secured to the base or frame 40 of the machine adjacent each work head is a casing 490 (Figs. 1, 3, 19, 20 and 21). Journaled in this casing is a cam shaft 491 (Figs. 19, 20, 21 and 22). This cam shaft carries a plurality of cams 492, 493, 494, 495, 496, 497, and 498 the contours of which are shown in Figures 25 to 30 inclusive. The casing is bored above each cam to receive a sliding plunger. In the case of all the cams except the magnet current control cam 492 this sliding plunger acts as a control valve. In the case of the magnet control cam this sliding plunger 500 (Fig. 23) carries a movable electrical contact piece which makes and breaks a circuit to the electro-magnet as will be described hereinafter.

In the cylinders 502 above the cams 493, 495, 496 and 497 there is a double action valve 504 such as shown in Figures 21, 24 and 43. The valves 506 sliding in the cylinders 507 above the cam 494 and 498 are single action valves, as shown in Figure 20.

The motive fluid enters the valve chambers 502 and 507 from a pipe 508 which is connected with a longitudinal bore 509 formed in the casing 490 and communicating ports 510 connecting this bore 509 with the various cylinders 509 and 507.

In the case of the double action valves, a pair of pipes 511 and 512 connect the valve chambers with opposite ends of the pistons controlled by the respective valves. In the case of the single action valves, namely the valves controlling the chucking and the starter valve to which reference will be made hereinafter, a single pipe 513 connects the valve chamber with one end of the piston which is controlled by the valve and fluid is supplied to this piston and exhausted from the same through this pipe 513.

The double action valves 504 are recessed at one end as at 515 to receive a coil spring 516 which seats in a suitable recess formed in the casings 490 and acts to constantly urge the valve 504 in one direction. The valve 504 is provided at its opposite end with a nose 517 which is adapted to be engaged by a rocker-arm 518 to move the valve 504 in its cylinder 502 against the action of the spring 506. Each valve 504 is provided with a pair of collars or shoulders 519 and 520 which serve to control the openings 521 and 522 communicating with the pipes 511 and 512, respectively. In the position shown in Figure 21, the supply is through the bore 509 and the opening 510 into the valve chamber 502 thence through the opening 522 into the pipe 512. The pipe 511 is on exhaust, exhausting through the opening 521, radial holes 524 formed in the valve, the bore 525 of the valve, an opening 526 formed in the casing at one end of the valve chamber and into the casing 490 whence the fluid flows back to the sump through the pipe 528. Each of the valves 504 is shifted from the position shown in Figure 21 at the proper time in the rotation of the cam shaft 491 by the corresponding cam, the cam surface of which engages a nose piece 530 formed on the lower end of the rocker arm 518 thus rocking this arm about its pivot 519 and forcing the valve 504 longitudinally in the cylinder 502 against the resistance of the spring 516. Through this movement of the valve, the pipe 512 is put on exhaust, exhausting through the opening 522, the radial holes 532 formed in the valve into the bore 525 of the valve, thence through the opening 526 into the casing chamber and thence by the pipe 528 back to the sump. The pipe 511 is put on supply from the pipe 508 through the bore 509, the communicating bore 510 and the opening 521. This reverses the direction of movement of the particular piston controlled by the valve.

The operation of the single action valve 506 is substantially the same as of the double action valve except that they are so constructed that exhaust and supply is through the same pipe 513. Supply to the valve chamber 507 is again through the bore 509 and the port 510. The valve 506 is provided with a recess at one end in which seats a coil spring 535, the opposite end of which seats in a recess formed in the casing 490. The opposite end of the valve 506 is provided with a nose 537 which is adapted to be engaged by a contact piece 538 on a rocker arm 518 of identical construction with the rocker arm 518 already described.

In the position shown in Figure 20, the pipe 513 is on exhaust, the motive fluid passing from the pipe 513 through the opening 539, the holes 540 formed in the valve, the bore 541 of the valve and the opening 542 into the valve casing 490 whence it flows by the pipe 528 back to the sump. When the valve 506 is moved in the cylinder 507 by the rocker arm 518 under actuation of the chuck cam 494 or the starter cam 498, the pipes 513 will be put on supply through the port 510 and opening 539.

The electro-magnet requires simply to be energized or de-energized at particular times in the operation of the loading mechanism. This is accomplished by a plunger 500 (Fig. 23) already refered to which slides in a bore 545 similar in construction to the cylinders 502 and 507 and extending above the magnet control cam 492. This plunger 500 carries a contact piece 546 which is adapted to close an electrical circuit to the electro-magnet through the terminals 547 and 548 mounted on the valve casing 490. A spring 549 interposed between the plunger 500 and the side wall of the casing 490 and seated in recesses formed in both serves to constantly urge the plunger 500 to the position shown in Fig. 23 where the circuit is broken. The plunger 500 is moved against the resistance of the spring to close the circuit at the proper time in the operation of the loading mechanism by a rocker arm 518 of identical construction with the rocker arms already described and rocked about its pivot 519 by the cam 492.

When the cam shaft 491 is put in rotation, then, the various valves 504 and 506 and the plunger 500 are moved in their respective cylinders or bores at the proper time in the cycle as determined by the contours of the cams to actuate in their proper time the various parts of the ejecting, chucking and loading mechanisms controlled by these cams.

As the starting mechanism has not yet been described, a more complete description of the operation of the various parts under actuation of the cams on the cam shaft 491 will be made below. I shall now describe the means for rotating the cam shaft 491. The cam shaft 491 is journaled at its forward end in suitable bearings 555 provided in a sleeve 556. This sleeve 556 is enlarged at its inner end and formed with peripheral cam surfaces 557 as clearly shown in Figure 22. Journaled on the sleeve 556 is an internal gear 558 (Figs. 19 and 22). A friction clutch or ratchet is adapted to connect this internal gear 558 with the sleeve 556 for rotation therewith in one direction of rotation of the sleeve 556. This friction clutch or ratchet comprises the cam surfaces 557, the balls or rollers 560 and the spring-pressed plungers 561 housed in the enlarged head of the sleeve 556. As will be seen, when the sleeve 556 rotates in one direction, the internal gear 558 will rotate with it and when the sleeve rotates in the opposite direction the internal gear 558 will remain stationary. The internal gear 558 meshes with a pinion 563 mounted on a stud 564 secured in the casing 490. The pinion 563 in turn meshes with a spur gear 565 which is keyed to the cam shaft 491. The internal gear 558, the pinion 563 and gear 565 form a reduction for rotating the cam shaft 491 at the desired speed.

The sleeve 556 is rotated back and forth by a segmental spur gear 567 which is keyed to the sleeve and which meshes with a rack 568 (Figs. 19 and 20), the teeth of which are cut in a piston 569 that reciprocates in a cylinder 570 formed by a bore transversely of the casing 490 which is closed by the end plates 571 and 572. Fluid pressure is admitted to opposite ends of the piston 569 through pipes 573 and 574. The speed of movement of the piston 569 in the cylinder 570 may be controlled by the manual valve 575.

The mechanism for rotating the cam shaft 491 is put into operation as the work head slide moves clear of the cutter after the blank has been completely cut by this movement of the work head itself. It has already been described how the tappets 120 and 121 (Figs. 1 and 5) limit the movement of the work head to the necessary movement required for feed and indexing during the cutting of the teeth on the blank and how during the last feed movement of the work head, the automatic control mechanism 317 (Figs. 1, 3 and 5) operates to lift the arm 127 out of line with the tappet 120, to permit the work head to move clear of the cutter until the piston 92 bottoms in its cylinder 90 (Figs. 1 and 4). The tappet slide 122 (Figs. 1 and 5) carries in addition to the tappets 120 and 121 a cam 580 (Figs. 1 and 18).

As the tappet slide moves with the cross head 94 and the work head slide 50 to chucking position, this cam 580 engages and depresses a plunger valve 582 in a cylinder 583 against the action of a spring 584. There is one cylinder 583 provided for each work head and each is secured at a convenient point to the base or frame 40 of the machine. The cam 580 is provided with a bevel at one end so that the valve 582 can be depressed easily and without any jar, by engagement of the cam surface of the cam with a roller 585 journaled in the upper end of the valve plunger 582. This valve 582 controls the movement of the piston 569 (Fig. 20) which operates the cam shaft 491.

The motive fluid is supplied to the valve chamber 583 from a pipe 586 and is exhausted therefrom through a pipe 587 which may be connected to the exhaust pipe 528 and thence to the sump as shown in Figure 1. The pipes 573 and 574 (Fig. 20) already referred to are connected to this valve cylinder 583, as clearly shown in Figure 1.

The valve 582 is provided with two collars 588 and 589 which control the openings from the valve chamber 583 to the pipes 573 and 574.

Normally, that is, during the cutting operation, the pipe 574 is on exhaust, but when the work head slide is withdrawn for chucking, the cam 580 engages the roller 585 and depresses the valve 582 against the resistance of the spring 584. The depressed position of the valve 582 is shown in Figure 18. In this position, the motive fluid flows from the supply pipe 586 into the valve chamber 583 thence into the piping 574 whence it enters the valve chamber 570 (Fig. 20) at the right hand end thereof, moving the piston 569 in this valve chamber 570 rotating the gear 567 and through the friction clutch and reduction gearing described rotating the cam shaft 491 (Fig. 19) to put the ejecting, chucking and loading mechanisms into operation. At the same time, the fluid is exhausted from the left hand end of the cylinder 570 through the piping 573, the hole 590 in the valve 582 (Fig. 18), the bore 591 in this valve and the exhaust pipe 587.

The cam 580 is adjustable on the tappet slide 120 (Figs. 1 and 5) by means of slots 593 formed in the cam, the cam being secured to the tappet slide by screws 594 passing through these lots 593. From what has been said, it will be seen that the outward movement of the work head slide for loading puts the loading mechanism into operation, through the action of the cam 580 on the valve 582.

After the new blank has been positioned on the work arbor, it is necessary to return the work head slide into operative relation with the cutter for the cutting of this new blank. This is accomplished at the proper time by the action of the starter cam 498 (Figs. 19 and 30) which rocks the corresponding rocker arm 518 to shift the corresponding single action valve from the position shown in Figure 20 to put the pipe 513 on supply. The piping 513 is connected, as shown in Figure 4, with a valve chamber 600. With this valve chamber 600 there is also connected a pipe 601 which conducts the motive fluid from the pipe 513 to the valve chamber 132 through the bore or duct 602. It will be clear that when the valve 603 is in the position shown in Figure 4, the valve 131 is moved to the position shown in this figure to cause the piston 91 to return the work head to operating position.

The valve 603 is provided with one collar 605 which controls the opening to the supply pipe 601. This valve 603 is also provided with a series of peripheral holes 606 which communicate through holes 607 drilled in the body of the valve with a permanent exhaust pipe 608 that is connected to the valve casing. The exhaust pipe 608 runs to the sump. The valve 603 is formed with pusher rods or studs 609 and 610 at opposite ends.

In connection with the return of the work head to operative position there is provided a safety feature which will now be described and which prevents return movement if the new blank has not been positioned on the work arbor. The normal position of the valve 603 is with the pipe 601 on exhaust. The valve 603 requires to be shifted mechanically in the valve chamber 600 to the position shown in Figure 4 in order to put the pipe 601 on supply and shift the valve 131 to return the work head to cutting position. This required shifting of the valve 603 is effected by the movement of the slide 380 (Figs. 10 and 13) in moving the new blank on to the work arbor. This slide 380 is provided with an arm 610 (Fig. 13) in which is threaded a screw 611 (Figs. 1, 4, 10 and 13) which contacts with the pusher rod 609 of the valve 603 and shifts the valve to the position shown in Figure 4. If the new blank has not been loaded on the work arbor, then the screw 611 cannot contact with the pusher rod 609 and the valve 603 will not be shifted and the work head cannot return to cutting position.

The valve 603 is returned to its normal position with the pipe 601 on exhaust by the movement of the turret arm 440, or rather the mechanism for causing the return of that turret arm to the position where the electromagnet registers with a blank in the magazine. For this return swinging movement of the turret 440 (Figs. 1, 10, 11 and 42) the piston 476 moves downward in the cylinder 477 causing the rack 474 to move downward. The rack 474 has a slot 482 in its side which permits of a certain movement of the rack before the end of this slot strikes a stud 620 (Figs. 11 and 42). This stud 620 is secured to an arm 621 (see also Figure 1). On the continued downward movement of the rack 474, this arm 621 is rocked in its bearing in the work head, rocking a lever arm 623 which is secured to the opposite end of the pin 624 on which the arm 621 is mounted. This lever arm 623 when rocked strikes the pusher rod 610 (Fig. 4) of the valve 603 shifting this valve back to normal position with the pipe 601 on exhaust.

Through the mechanism which has been described, it will be clear that in the action of completing the loading operation the loading mechanism will shift the valve 603 to start the work head back to operative position and that in the return movement of the loading turret 440 to its normal position, the valve 603 is shifted to its normal position to throw the pipe 601 on exhaust.

The several valves 502 and 506 and the plunger 500 may be tripped by hand when for any reason it is desired to actuate any one or all of the parts controlled by the same. For this purpose finger trips 625 (Figs. 19 and 21) are provided. These trips of which one is provided for each rocker arm 518, are pivotally mounted at 626 on the swinging cover 627 of the casing 490 in position to engage the rocker arms when the cover is swung to closed position as shown. The trips are formed with cam or eccentric surfaces 628 at their inner ends which contact with flat surfaces 629 formed on the rocker arms 518. When the finger pieces 625 are lifted, the surface 628 will engage the flat 629 of the corresponding rocker arm 518 to move the valve or plunger controlled thereby against the action of the corresponding spring. The casing cover 627 is pivoted at 780 on the casing and may be locked closed by the knurled nuts 781 which thread onto trunnioned bolts 782. The cover permits ready access to the casing.

As previously stated and as will be clear from Figure 2, there is a magazine mounted adjacent each work head which is arranged to carry a plurality of gear blanks that are successively loaded onto the corresponding work head for cutting. Each magazine comprises a pair of side-bars or rests 630 on which the gear blanks G are adapted to rest as clearly shown in Figure 34. These side bars 630 are adjustably secured to a bracket 631 by means of T-bolts 632 which engage in transverse slots 633 formed in the side-bars 630. The bracket 631 is provided at one end with a post or trunnion 635 that is adjustably clamped through a split clamp and a bolt 636 (Figures 33 and 11) in a bracket 637 which is secured to the work head. Adjustably secured to each of the side-bars 630 by the bolts 638 which engage in slots 639 formed in the side bars is a side rail 640. The two side bars 640 serve to hold the blank G against sidewise movement in the magazine and to guide the blanks as they are fed forward in the magazine. Only one blank is shown in Figures 32 to 34 inclusive for the sake of clearness in illustration. It will be understood, however, that when the magazine is fully loaded it holds a number of blanks.

The adjustment of the post 635 in the bracket 637 permits of positioning the magazine 635 at any desired angle as required by the change in angular position of the work head in cutting blanks of different pitch cone angles. The adjustment of the side-bars 630 on the bracket 631 and the adjustment of the side rails 640 on the side-bars 630 are for accommodating gear blanks of different dimensions.

Mounted between the side bars 630 for reciprocating movement relative thereto in a direction parallel to the side bars are a pair of bars or rails 642. Each of these rails 642 is provided with a pair of cam slots 643 as clearly shown in Figures 33 and 35. Pins 645 which are secured to the side-bars 630 engage in the cam slots 643. The shape of the cam slots is such that in the rear position of the rails 642 shown in the figures, the upper surfaces of these rails 642 lie below the surfaces of the side-bars 630 on which the gear blanks rest. When, however, the rails 642 are moved forward, they are lifted by the pin 645 lifting the gear blanks G off of the side-bars 630 and moving the blanks forward. When the rails 642 return again to their rear position they leave the gear blanks forward behind them so that by the alternate forward and reverse movement of the rails 642, the blanks G are fed forward continuously in the magazine.

The side rails 642 are reciprocated by the movement of a piston rod 650 which slides through a hole formed in a depending portion 652 of the brackets 631. This piston rod 650 (Figures 32, 33, 36 and 37) is provided with an enlarged bifurcated head 653 at its outer end in which is secured a pin 654. Pivotally mounted on the depending portion 651 of the bracket 631, as at 655 is a link or lever arm 656 which is provided with a U-slot in each end. The link 656 engages through the U-slot 657 at one end the pin 654 and at the other end a pin 658 which connects the two side rails 642. It will be obvious, therefore, that when the piston rod 650 is reciprocated the side rails 642 will be reciprocated.

The piston rod 650 is connected to a piston 660 (Fig. 36) which reciprocates in a cylinder 661 formed in a casing 662. This casing 662 is bored to provide in addition to the chamber 661 for the piston 660, two additional chambers 663 and 664 for the valves 665 and 666, respectively. Each of the valves 665 and 666 are provided with four collars 668, 669, 670, 671 and 672, 673, 674 and 675, respectively.

Supply to the casing 662 is through the piping 680 and exhaust is through the piping 681. The supply pipe 680 is connected with the valve chamber 664 through an opening 683 (Figs. 36 and 37) and is connected with the valve chamber 663 through a bore 684 in the casing and the port 685. The motive fluid is exhausted from the cylinder 661 through the hole 687 drilled in the piston 660 and the bore 688 drilled in the piston rod 650.

Valve chamber 663 is connected with one end of the piston 666 which travels in the valve chamber 664 by the bore 690 which opens at 692 and 693, respectively, into the chambers 663 and 664. The two valve chambers are also connected by the bore 694. The valve chamber 663 is connected by the bores 695 and 696 with the cylinder 661 on opposite sides of the collar 697 of the piston 660. The valve chamber 664 is connected with the cylinder 661 on one side of the collar 699 of the piston 660 by the bore 700 which opens at 701 into the valve chamber 664. The valve chambers 663 and 664 are connected with the cylinder 661 by a bore 702 opening at 703 on the opposite side of this collar 699 into the cylinder 661 this bore 702 being connected at two spaced points 704 and 705 with the valve chamber 664 and at two spaced points 706 and 707 with the valve chamber 663. The valve chamber 664 is connected with the cylinder 661, also, by a bore 708 opening at 709 into the cylinder 661 and at 710 into the valve chamber 664.

In the position shown in Figure 36, the piston 697 and the valves 665 and 666 are at the limits of their movement in one direction. In this position, the supply has been from the pipe 680 through the opening 683, the opening 710, the bore 708 and the opening 709 to one side of the piston 660. It has also been through the bore 684, the opening 685, the opening 692, the bore 690 and the opening 693 to one side of the valve 666. The exhaust has been from the valve chamber 664 through the bore 694, opening 707, bore 702, opening 703, hole 687, bore 688 and pipe 681. At the same time, the exhaust from the cylinder 661 has been through the bore 700, the opening 701, the opening 705, the bore 702, the opening 703 and through the piston rod to the exhaust pipe 681.

The piston 660 in its movement has first cleared the opening 715 from the cylinder 661 into the bore 695. The supply which has been entering the chamber 661 through the port 709 now passes out of that chamber through the opening 715 and the bore 695 into the valve chamber 663 shifting the valve 665. The fluid is, of course, exhausted from the opposite end of the valve through the bore 696 into the cylinder 661 whence it flows through the hole 687 to the exhaust pipe 681.

The shifting of the valve in the manner described puts the bore 694 connecting the valve chamber 663 with the valve chamber 664 on supply from the bore 684 and opening 685. At the same time, the port 692 is put on exhaust through the opening 706. The valve 666, therefore, is shifted in the valve chamber 664. With the shift of this valve 666, the port 701 is put on supply and the port 710 is put on exhaust through the port 704. This causes the piston 660 to move in the reverse direction in the cylinder 661. It continues to move in that direction until the collar 699 of the piston clears the opening 718 connecting the chamber 661 with the bore 696, when the valve 665 is again reversed causing the reversal of the valve 666 and of the piston 660 and causing them all to assume the positions shown in Figure 36.

The operation of the machine illustrated will be clear from the preceding detailed description, but may be briefly summed up here. The various work heads 52 (Figures 1 and 2) will be first adjusted each to the correct angle on its work head slide 50 to position the blank mounted thereon in the correct relation with the cutting tool 47 to cut the teeth in the blank. It will be understood that this adjustment will be the same if the four work heads are all to cut the same type of gear and will be different if gears of different pitch cone angles are to be cut on the different work heads. The block 114 (Fig. 1) will be adjusted by the screw 115 so as to give the work head slide a proper feeding movement to cut tooth spaces of the required depth in the blank. The various magazines 365 will be adjusted angularly in correspondence with the angular adjustment of their respective work heads and the side-bars 630 and side rails 640 (Figs. 32, 33 and 34) of the magazine will be adjusted to suit the size of the gear blanks to be placed in the respective magazines. Each set of screws 483 and 484 (Fig. 10) is then adjusted to limit the swinging movement of the corresponding turret 440 to the extent required to swing the electro-magnet from the corresponding magazine 365 into alignment with the corresponding work arbor. The nuts 763 and 765 are adjusted on the screw rod 764 to limit the sliding movement of the slide 380 (Fig. 10) by contact with the block 762 secured to the slide. The lug 400 on each slide 380 (Fig. 10) is then adjusted to limit as required the vertical movement of the corresponding cylinder 378. An index plate 220 (Fig. 6) having the required number of notches corresponding to the number of teeth to be cut in the blank will be secured to each work spindle and the screws 305 and 306 of each work head will be adjusted in accordance with the number of teeth to be cut in the blank.

Assuming the required adjustments to have been made and a blank secured to the work arbor, we can now briefly review the operation of one work head. It will be understood that the operation of the several work heads is identical although each operates independently of the others. It is assumed, of course, that the cutter 47 has already been set in motion. This cutter will be rotated continually during the operation of the machine from the motor 60 through the gearing 61, 62, the shaft 63, the pinion 64 and the internal gear 65 (Fig. 1). As the cutter rotates, the work head slide 50 and the work head 52 carried thereby moves back and forth relative to the cutter, a tooth space being cut in the blank on the forward movement of the work head and the blank being indexed on the reverse movement. The reciprocating motion of the work head slide 50 is effected by reciprocation of the piston 91 in the cylinder 90 (Figs. 1 and 4) through the cross-head 94, the toggle links 99 and 100, and the bell crank lever 106 and the link 111. The toggle linkage, as previously described, imparts a feed movement to the blank at a variable speed through which a slow, fine feed of the blank is attained as it moves into full depth.

The piston 91 is reversed by the movement of the cross-head 94. This is through a tappet slide 120 (Figs. 1, 3 and 5) which is connected with the cross-head by the rod 126 and which carries two tappets 120 and 121 which engage and shift an arm 127 first in one direction and then in the other at the two ends of the movements of the cross-head. The shifting of the arm 127 shifts the valve 131 (Fig. 4) which is connected with that arm 127 by the piston rod 130. This valve 131 controls the movement of a valve 135 which in turn controls the movement of the piston 191. With the parts in the position shown in Figure 4, the supply is from the main supply pipe 144 through the pipe 146 into the valve casing 142, thence through the duct 162 and the pipe 163 to move the valve 135 to the right in the valve casing 155. The motive fluid is exhausted from the opposite end of the valve 135 through the pipe 161, the holes 176 in the valve 131, the bore 175 of that valve, the holes 177 and the exhaust pipe 147 back to the sump. With the valve 135 moved to the right into the position shown in Figure 4, the supply is from the supply pipe 144' through the elbow 153 and the duct 158 to the right hand end of the piston 91. When the valve 131 is shifted as the work head slide reaches the limit of its movement inwardly, the pipe 163 is put on exhaust and the pipe 161 on supply thus shifting the valve 135 with the consequence that the supply to the cylinder 90 is from the T 152 through the duct 157 thus moving the piston to the right from the position shown in Figure 4. The fluid is exhausted from the cylinder 90 at this time through the duct 158, the holes 183, the bore 180 and the holes 182 of the valve 135, the duct 165 and the pipe 166 back to the sump.

In the reverse movement of the work head away from the cutter, the stud 295 (Figs. 1, 8 and 9) of the valve 260 strikes the tappet 299 and the valve 260 is moved to the position shown in Figures 8 and 9 against the resistance of the spring 293. With the valve so moved, the supply is opened to the valve chamber 235 (Fig. 6) from the pipe 263 through the bore 266 (Fig. 8) the duct 268, the opening 271 and the pipe 273. At the same time the motive fluid is exhausted from above the piston 230 (Fig. 6) by the pipe 272 through the opening 270, the holes 300, the bore 292 of the valve 260 and the pipe 264.

With the fluid being pumped into the cylinder 235 from the pipe 273, the piston 230 (Fig. 6) is forced upward in the cylinder 235 lifting the locking dog 223 out of engagement with the index plate 220 through the connection of the piston rod 231 with the arm 225 carrying the locking dog. When the locking dog 223 has been lifted clear of the notch in the index plate, the piston 235, which acts, also, as a valve, will have opened the pipe 283 to supply from the pipe 273 and at the same time the pipe 282 will be put on exhaust through the openings 280 and 278 to the permanent exhaust pipe 279. The fluid will now be pumped into the cylinder 250 (Fig. 6) forcing the piston 249 to the left in that cylinder rotating the arm 243 through engagement of the rack teeth 248 with the gear segment 247 and causing the work spindle to be indexed by engagement of the pawl 240 with a notch in the plate 220. The extent of movement of the piston 249 will be limited by engagement of the screw 305 with the stud 309. When or before the stud 295 (Figs. 8 and 9) has reached the limit of its movement in the slot 296, the work head slide will be reversed to start the feeding movement again through the mechanism already described. The valve 260 will be immediately shifted, therefore through the action of the spring 293. The shifting of this valve will put the pipe 272 on supply and the pipe 273 on exhaust (Fig. 6). The valve 230 will, therefore, move downwardly. As it moves down, its first action is to put pipe 283 on exhaust and the pipe 282 on supply thus moving the piston 249 to the right and returning the arm 243 to the position shown in Figure 6. During this return movement of the arm 243, the pawl 240 ratchets idly over the index plate 220 and the index plate is held against reverse movement by engagement of the pawl 253 with the ratchet piece 252. In the further downward movement of the piston 230, the locking dog 223 is re-engaged with the index plate entering the new notch which has been brought into position by the pawl 240. The locking dog 223 holds the index plate and the work arbor against rotation during cutting.

On each stroke of the piston 91, the corresponding control device 317 is advanced one step by engagement of the rod 315 (Fig. 1) secured to the cross-head 94 with the lower end of the lever arm 316. In the last feed movement of the work head slide, this control device 317 is tripped lifting the arm 127 (Figures 1 and 5) out of line with the tappet 120 through the linkage 320, 321, 324 (Figure 3) and swinging the tappet 299 (Fig. 8) out of line with the stud 295 through the linkage 320, 321, 323 and 327 (Figures 3 and 8). With the arm 127 lifted out of line with the tappet 120, the work head will move clear out on its subsequent reverse movement. With the swinging of the tappet 299 out of line with the stud 295, the index mechanism will remain inoperative during the same reverse movement of the work head slide.

As the work head slide moves out to inoperative position, the roller 210 (Figs. 1 and 4) clears the nose 216 of the cam 200 permitting the valve 150 to open full under actuation of the spring 212 and accelerating the outward movement of the work head slide. As the work head slide moves outwardly, also, the came 580 (Figs. 1 and 18) engages the roller 585 to depress the valve 582, setting into motion the chuck releasing, ejecting and loading mechanism.

Depression of the valve 582 opens the piping 574 to supply from the pipe 586 and puts the pipe 573 on exhaust through the pipe 587. The two pipes 574 and 573 are connected, respectively, with opposite ends of the cylinder 570 (Figure 20). With the pipe 574 on supply and the pipe 573 on exhaust, the piston 569 is moved to the left (Fig. 20) in the cylinder 570 rotating the cam shaft 491 (Fig. 19) through the rack 568, the spur segment 567, the friction clutch shown in Figure 22, the internal gear 558, the spur pinion 563 and the spur gear 565.

It will be understood that the electro-magnets of the loading mechanism are in the positions shown at A, B, or C in Figure 2 extending over the foremost blank in the magazine 365. As the cam shaft 491 rotates, its first action is to energize the electro-magnet by rocking the rocker arm 518 through engagement of the cam surface of the magnet control cam 492 with the stud 530 on this rocker arm. This rocks the rocker arm 518 shifting the plunger 500 (Fig. 23) and closing the circuit to the electro-magnet through the terminals 547 and 548 and the contact plate 546. It might be noted that the circuit from the terminals 547, 548 extend through the pipe 720 (Fig. 10) which is secured to the work head, the pipe 721 (Figs. 10 and 16), the terminals 722 and 723, secured in the upper trunnion 725 which guides the turret 440 in its rotary movement, the commutator rings 726 and 727, the terminals 728 through the wires 729 (Figs. 14 and 16) to the coil 375 in the electro-magnet.

When the electro-magnet has been energized in the manner just described, it picks up the foremost gear blank off of the magazine. In the further rotation of the cam shaft 491 (Fig. 19) the control cam 495 (Fig. 27) engages its rocker arm 518 rocking the same about the pivot 519 (Fig. 21) and shifting the corresponding valve 504 from the position shown in Figure 21 against the resistance of the spring 516 to put the pipe 511 on supply from the bore 509 and the pipe 512 on exhaust through the opening 522, the holes 532 in the valve 504, the bore 525 of the valve 504, the opening 526 and the exhaust pipe 528. The pipe 511 (Fig. 21) in this case is connected with the bore 389 (Fig. 15) through the duct 395, the pipe 396, the duct 730 (Fig. 16), the chamber 732 which is divided off into compartments by the rings 733, 734 and 735 of the trunnion 736, the opening 738, the bore 739, the opening 740 and the piping 741 (Fig. 1). The pipe 512 is connected with the bore 388 (Fig. 15) through the duct 394, the pipe 397, the bore 745 (Figs. 10 and 16) the opening 746, the bore 747, the opening 748 and the piping 749 (Fig. 1).

It will be seen, therefore, that when the projection 750 on the cam 495 (Fig. 27) engages the rocker arm 518 to shift the corresponding valve 504 from the position shown in Figure 21 that fluid pressure will be admitted into the cylinder 378 (Figs. 10 and 15) through the opening 390 and exhausted from this cylinder through the bore 388. As the piston 382 is stationary it follows that the cylinder 378 will move upwardly carrying the electro-magnet 370 clear of the magazine. In the further rotation of the cam shaft 491 (Fig. 19) the chuck control cam 494 operates its rocker arm 518 to shift its valve 507 from the position shown in Fig. 20 putting the pipe 513 on supply from the pipe 508 through the bore 509, the opening 510 and the opening 539 (Fig. 20). With the pipe 513 on supply, the motive fluid will pass into the cylinder 344 (Fig. 17) through the pipe 352 which is connected with the pipe 513. The piston 345 will be forced upwardly, therefore, in the cylinder 344 rocking the mushroom head 331 to the position shown in Figure 17 through the lever 339 and the link 336. This will force the draw-rod 75 forward in the bore of the arbor 72 against the resistance of the spring 85 moving the taper head 77 of the draw-rod to released position and permitting the fingers 73 to collapse and release the now completed gear blank G.

During the opening of the chuck in the manner just described, the cam shaft 491 (Fig. 19) continues its rotation and the projection of the turret control cam 497 (Fig. 28) strikes and rocks its rocker arm 518 to shift its valve 504 (Fig. 21), put its pipe 511 on supply and its pipe 512 on exhaust. This particular pipe 511 is connected with the pipe 480 (Fig. 11) and this particular pipe 512 is connected with the pipe 479 as shown in this same figure. The piston 476 is, therefore, forced upwardly in the cylinder 477 to the position shown in Figure 11. As it moves upwardly, the rack 547 engages and rotates the gear 473 and through the shaft 468, the pinion 465 and the bevel gear segment 466 swings the turret 440 from a position over the magazine to a position in alignment with the work arbor, a position similar to that shown at D in Fig. 2.

During the swinging motion of the turret 440, the slide 380 (Figs. 10 and 13) start moving outwardly. This is the result of the projection 752 of the turret control cam 496 (Fig. 26) striking and rocking its rocker arm 518 (Fig. 21). This shifts its valve 504, putting its pipe 511 on supply and its pipe 512 on exhaust. These two pipes are connected by piping 755 and 756, respectively, Figure 1 (with openings 758 and 759) in the turret 440 (Figure 17) whence they are connected through the bores 760 and 761, respectively, and the openings 453 and 454, respectively, with opposite ends of the piston 445. The piston 445 is, therefore, forced outwardly in the cylinder 448 carrying with it the slide 380 (Figs. 10 and 15) until the block 762 on the slide strikes the nuts 763 on the rod 764 which is secured in the turret 440.

When the chuck has been opened through the mechanism above described, the ejector functions to eject the completed gear G from the arbor. This is the result of the projection of the ejector control cam 493 (Fig. 31) striking and rocking its rocker arm 518 in the further rotation of the cam shaft 491 (Figs. 19 and 21). The movement of the rocker arm 518 shifts its valve 504 against the action of the spring 516 to put its pipe 511 on supply and its pipe 512 on exhaust. This particular pipe 511 is connected with the ejector cylinder 360 (Fig. 17) through the pipe 361 while this particular pipe 512 is connected with the ejector cylinder 360 through the pipe 362 (Fig. 11). The piston 359 moves forward, therefore, in the cylinder 360 carrying with it the arm 356 and the collar 355 to force the completed gear blank off the work arbor as shown in Figure 17.

In the further rotation of the cam shaft 491 (Fig. 19) the stud 530 of the rocker arm 518 cooperating with the valve 504 controlling the movement of the cylinder 378 (Figs. 1, 10 and 15) drops off of the projection 750 of the cam 495 controlling the movement of this cylinder. The valve 504 is, therefore, shifted back to the position shown in Figure 21 by action of the spring 516 putting the pipe 511 on exhaust and the pipe 512 on supply, exhausting from the cylinder 378 (Fig. 15) through the opening 390 and supplying this cylinder through the bore 388. The cylinder 378 moves downward, therefore, to bring the blank into registration with the work arbor.

During this downward movement, the rocker arm 530 of the rocker arm 518 (Fig. 21) which engages the valve 504 controlling the movement of the ejector piston 359 (Fig. 17) drops off of the projection of the ejector control cam 493 and the valve 504 is reversed under actuation of the spring 516 putting the pipe 361 on exhaust and the pipe 362 on supply and moving the ejector arm 356 and collar 355 back to normal position, that shown in Figure 10.

In the further rotation of the cam 491 (Fig. 19) the contact piece 530 of the rocker arm 518 which moves the cam 504 controlling the movement of the slide 380 (Figs. 10, 13 and 15) drops off of the projection 752 of the cam 496 (Fig. 26) and the spring 516 acts, therefore, to shift the corresponding valve 504 and put the pipe 511 on exhaust and the pipe 512 on supply. This causes the motive fluid to exhaust from the cylinder 448 (Fig. 17) through the opening 453 and to pass into that cylinder through the opening 454. This causes the slide 380 to move inwardly with reference to the work arbor pushing the new gear blank carried by the electro-magnet 370 onto the work arbor.

During this last movement, the contact point 530 of the rocker arm 518 (Fig. 21) controlling the movement of the plunger 500 (Fig. 23) drops off of the projection of the magnet control cam 492 (Fig. 25) and the spring 547 returns the plunger to the position shown in Fig. 23 deenergizing the electro-magnet. If the electro-magnet has been brought properly into registration with the work arbor and the blank goes on the arbor, the screw 611 will strike the push-rod 609 (Figs. 10 and 4) during this last named movement, thus shifting the valve 603 to the position shown in Fig. 4 so as to open the pipe 601 to supply from the pipe 513 and permit the work head to be returned to operating position after the loading of the blank as will be described below.

With the new gear blank on the arbor, the contact point 530 of the rocker arm 518 (Fig. 20) controlling the movement of the corresponding valve 507 will drop off of the projection of the cam 494 (Fig. 29) allowing the valve 507 to be shifted by the spring 535 and put the pipe 513 on exhaust as shown in Figure 20. This will cause the motive fluid to be exhausted from the cylinder 344 (Fig. 17) and permit the draw-rod 75 to be returned to chucking position by the spring 85 forcing the spring fingers 73 outwardly and securely clamping the new gear blank G on the work arbor. Blanks are shown in chucked position in Figures 1 and 2.

In the further rotation of the cam shaft 491 (Fig. 19), the contact point 530 of the rocker arm 518 controlling the movement of the valve 504 (Fig. 21) which controls the slide 380 (Figs. 10, 13 and 15) engages the projection 780 of the cam 496 (Fig. 26) shifting the corresponding valve 504 (Fig. 21) against the action of the spring 516, putting the pipe 511 again on supply and the pipe 512 on exhaust. This causes the piston 445 (Figs. 10 and 17) to again move outwardly moving the slide 380 with it.

During this outward movement of the slide 380 and through the continued rotation of the cam shaft 491 (Fig. 19), the rocker arm 518 controlling the movement of the cylinder 378 (Figs. 10 and 15) engages the projection 781 of the cam 495 (Fig. 27) and the corresponding pipe 511 is again put on supply while the corresponding pipe 512 is put on exhaust, and this causes the cylinder 378 to move upwardly.

In the further rotation of the cam shaft 491 (Fig. 19) the contact point 530 (Fig. 21) of the rocker arm 518 controlling the movement of the corresponding valve 504 which in turn controls the movement of the turret 440 (Figs. 10, 11 and 17) drops off of the projection of the cam 497 (Fig. 28) and the valve 504 is shifted by the corresponding spring 516 putting the corresponding pipe 511 on exhaust and the corresponding pipe 512 on supply. This puts the pipe 479 (Fig. 11) on supply and the pipe 480 on exhaust causing the piston 476 to move downward in the cylinder 477 and through the gears 474, 473, 465, and 466 rotating the turret back to its position over the magazine.

In the further rotation of the cam shaft 491 (Fig. 19), the projection of the cam 498 (Fig. 30) strikes and rocks its rocker arm 518 (Fig. 20) to shift the corresponding valve 507. If the valve 603 (Fig. 4) has been opened up previously by the movement of the slide 380 (Figs. 10, 13 and 17) in pushing the new blank on the work arbor, then the movement of the valve 507 by the cam 498 has the effect of putting the pipe 513 on supply from the pipe 508 through the bore 509 and opening 510 and from this pipe 513 the fluid flows through the valve casing 600 (Fig. 4) through the pipe 601 shifting the valve 131 to the right as shown in Figure 4.

With this valve 131 shifted as just described, the pipe 163 (Fig. 4) is put on supply and the pipe 161 on exhaust thus shifting the valve 135, putting the duct 158 on supply and the duct 157 on exhaust. The piston 91 is thus moved to the left in the cylinder 90. This returns the work head to operating position and in this return movement, the arm 127 drops over the tappet 120 in position to permit of the resumption of the alternate feed and indexing movement of the work head slide. The tappet 120 is so shaped as to permit of this return of the arm 127 to position. In the movement of the arm 127 back to position, the tappet 299 (Fig. 8) is returned to position to shift the index control valve 260 in the further operation of the machine. It will be understood, of course, that the automatic control device 317 resets itself automatically.

The valve 603 (Fig. 4) is shifted back to closed position by movement of the stud 610 by the arm 623 (Fig. 42) as the turret 440 returns to position over the magazine. The turret is swung back to position by downward movement of the rack 475 and in its downward movement the end wall of the slot 482 in the rack engages the stud 620 rocking the arm 623 shifting the valve 603 back to closed position.

The several operations of releasing the completed work piece, ejecting it, loading a new blank, chucking it and starting the return movement of the work head slide are accomplished in one revolution of the cam shaft 491 (Fig. 19). Figure 24 is a layout indicating just when these operations take place in the rotation of this cam shaft. The numbers 0 to 360 in this figure indicate degrees from which the positions of the cam shaft when the various operations take place can be read.

The magazine feed mechanism operates independently of the rest of the machine and may be operated continuously while the machine is in operation, moving the side rails 642 back and forth continuously to keep the blanks in the magazine fed continuously forward. As a very complete description of this mechanism has been given above, it need not be repeated here.

While I have described my invention in connection with a machine for roughing gears, it is to be understood that the invention is not to be restricted to the embodiments shown or to the use described. There are many features of the invention which are capable of general use and I do not wish to be understood as restricting the invention any more than is required by its scope and the limits of the appended claims. In general, it may be said that while the invention has been described in connection with a particular embodiment it is to be understood that it is capable of various modifications within its scope and that this application is intended to cover any variations, uses, or adaptations of the invention following, in general, the principles of the invention and including such departures from the present disclosure as come within known or customary practice in the art to which it pertains and as may be applied to the essential features set forth and as fall within the scope of the invention or the limits of the appended claims.

Having thus described my invention, what I claim is:

1. In a machine for producing gears, the combination with a tool mechanism, a work spindle, and means for securing a gear blank to the work spindle, of means for producing a partial relative withdrawal motion between tool and blank periodically for indexing and for effecting a complete relative withdrawal of the tool away from the blank after the cutting operation on the blank has been completed, said last named movement being in the same direction as the partial withdrawal movement and means actuated on the last named movement for releasing the blank securing means.

2. In a machine for producing gears, the combination with a tool mechanism, a work spindle, and means for securing a gear blank to the work spindle, of means for automatically producing a partal relative withdrawal movement between tool and blank periodically for indexing and for automatically effecting a complete relative withdrawal of the tool away from the blank after the cutting operation on the blank has been completed, means actuated on the last named movement for releasing the work securing means and means for thereafter forcing the work off the spindle.

3. In a machine for producing gears, the combination with a tool mechanism, a work spindle, and means for securing a gear blank to the work spindle, of means for effecting a relative withdrawal of the tool mechanism completely away from the blank after the cutting operation on the blank has been completed, and means actuated on the last named movement for releasing the work securing means and for thereafter forcing the work off the spindle.

4. In a machine for producing gears, a tool mechanism, a work spindle, mechanism for effecting the cutting of the work, means for automatically chucking a blank on the work spindle while said last named mechanism is inoperative and means actuated when the chucking operation is completed to start the mechanism for effecting cutting into operation.

5. In a machine for producing gears, a tool mechanism, a work spindle, means for securing a gear blank to the work spindle, means for effecting a cutting operation upon the blank, means for automatically chucking a blank on the work spindle, said last named means being inoperative during cutting, means for withdrawing the tool mechanism relative to the work spindle after the cutting operation has been completed, and means actuated on said withdrawing movement to release and eject the completed work from the spindle and thereafter put the chucking mechanism into operation to chuck a new blank.

6. In a machine for producing gears, the combination with tool mechanism, a work spindle, means for holding the gear blank on the work spindle and means for effecting a cutting operation, of means for producing a relative withdrawal movement between the tool mechanism and work spindle after the cutting operation has been completed, a magazine adapted to carry a plurality of gear blanks and means actuated on the withdrawal movement for releasing and ejecting the completed work piece from the work spindle and transferring a new blank from the magazine to the spindle.

7. In a machine for producing gears, the combination with a tool mechanism, a work spindle, means for securing a work piece on the work spindle, and means for effecting a cutting operation on the work piece, of means for producing a relative withdrawal movement between the tool mechanism and work spindle after the cutting operation is completed, a magazine adapted to carry a plurality of gear blanks, means actuated on each withdrawal movement for releasing and ejecting the completed work piece from the work spindle and transferring a new blank from the magazine to the spindle and for thereafter securing the new blank in position on the work spindle.

8. In a machine for producing gears, a work spindle, a magazine adapted to carry a plurality of gear blanks, a transfer arm, means for moving said arm from a position of registration with the foremost blank in the magazine to a position of registration with the work spindle, means for producing a relative movement of the work spindle and transfer arm toward each other when in registry, an electro-magnet secured to the transfer arm and adapted to pick up and hold a gear blank, means whereby the magnet is energized when in registry with the foremost blank on the magazine and during transfer of said blank from the magazine to the work spindle and until through the relative movement between the spindle and arm the blank is positioned on the spindle and is then deenergized, and means for automatically securing the blank to the spindle when it has been positioned thereon.

9. In a machine for producing gears, a magazine adapted to carry a plurality of gear blanks comprising a pair of side rails on which the blanks are adapted to rest, an arm positioned intermediate the side rails, and means for moving the arm simultaneously upwardly under the gear blanks and forwardly parallel to the side rails to lift the blanks off the rails and feed them forwardly in the magazine.

10. In a machine for producing gears, a work spindle, a notched plate secured to the work spindle, a locking dog adapted to engage the notched plate for securing the work spindle against movement during cutting, and hydraulically operated mechanism for disengaging said locking dog and thereafter rotating said work spindle to index the same, said mechanism being so constructed that the locking dog must be wholly disengaged before the work spindle can be rotated.

11. In a machine for producing gears, a work spindle, a rod reciprocable in said spindle and in the bore of the gear to be cut, means carried by said rod adapted to clamp said gear on said spindle, a tiltable member mounted in the bore of said spindle and engaging the inner end of said rod, a coil spring interposed between said rod and spindle and adapted to actuate the clamping means into clamping position and hold the inner end of said rod in engagement with said tiltable member, and hydraulically operated means for rocking said tiltable member to move said rod against a resistance of said spring to release the gear blank, comprising a cylinder secured to the work spindle, a piston movable in said cylinder, an arm pivotally mounted on the work spindle, one end of which is engaged by one end of said piston, a link connected at one end to the opposite end of said arm and at its other end to said tiltable member, and means for admitting fluid pressure to the opposite end of said piston from that engaged by said arm.

12. In a machine for producing gears, a work spindle, means for securing a gear blank to the work spindle, means for releasing said work securing means and means for thereafter forcing the work off the spindle comprising a member adapted to engage the work piece, a cylinder, a piston movable in said cylinder and secured to said member and means for admitting fluid pressure to one end of the piston.

13. In a machine for producing gears, a work support, a tool support, a tool mechanism mounted thereon, means for actuating the tool mechanism, and means for moving one of said supports toward the other to cut teeth in the work comprising a reciprocable cross-head, a block slidable in a slot in said head, a pair of toggle arms, one of which is pivoted at one end to said block and at its opposite end to the frame of the machine and the other of which is pivotally connected to said block and in linkage connecting the other end of the latter arm to said movable support.

14. In a machine for producing gears, a work support, a tool support, a tool mechanism mounted thereon, means for moving said supports toward and from each other for cutting and for chucking of a new blank, a magazine adapted to carry a plurality of blanks, means for automatically transferring a blank from said magazine and chucking it on said work spindle while said movable support is in the withdrawn position, and means preventing return of said movable support into cutting position if the new blank has not been positioned on the work spindle by the chucking mechanism.

15. In a machine for producing gears, a tool support, a work support, one of which is movable toward and from the other alternately to feed the work relative to the tool mechanism and withdraw the work from the tool mechanism for indexing, means for reciprocating said movable support including a piston and cylinder and a toggle mechanism actuated by the same for moving the movable support, a movable valve controlling the duct-openings of the supply pipes conducting fluid to opposite ends of the piston and a cam secured to the movable support controlling the position of said valve.

16. In a machine for producing gears, a work support, a tool support, a tool mechanism mounted thereon, hydraulically operated means for reciprocating one of said supports including a piston and cylinder, means for admitting fluid pressure to opposite ends of said piston, a valve for controlling the direction of application of said fluid pressure, lugs on the reciprocable support for moving said valve at opposite ends of the normal movement of said support, one of said lugs being movable, and means controlled by the number of teeth to be cut in the gear for moving said movable lug out of the path of said valve to permit movement of the movable support to full withdrawn position after the required number of teeth have been cut in the blank.

17. In a machine for producing gears, a work spindle, a magazine adapted to carry a plurality of gear blanks, a blank loading mechanism including a movable transfer arm adapted to be moved from a position of registration with the magazine to a position of registration with the work spindle, means for releasably holding a blank on said arm, and means for moving the arm in a direction at an angle to its transfer movement to position the blank on the work spindle and withdraw the arm, means for clamping the work on the spindle and means for controlling the operation of said parts so that these operations occur in proper sequence.

18. In a machine for producing gears, a work spindle, a magazine adapted to carry a plurality of gear blanks, a blank loading mechanism including a movable transfer arm adapted to be moved from a position of registration with the magazine to a position of registration with the work spindle, means for releasably holding a blank on said arm, means for reciprocating said arm in a direction at an angle to its transfer movement to position a blank on the work spindle and withdraw the arm after the same has been positioned, means for clamping a blank on the spindle and hydraulically operated mechanism for controlling the operation of said parts so that these operations occur in proper sequence.

19. In a gear cutting machine, a tool support and a work support, one of which is movable toward and from the other and means for effecting said movements to feed the work into the tools and withdraw the same periodically for indexing including a toggle mechanism which is pivotally connected to said movable part and means for automatically moving said toggle mechanism alternately in opposite direction.

20. In a machine for producing gears, a work support, a magazine adapted to carry gear blanks, and transfer mechanism operable automatically when the work holder is in loading position to transfer a blank from the magazine to the work support comprising a transfer arm, a blank gripping device mounted on said arm, and means for reciprocating said arm and oscillating the same to effect said transfer operation and then return the arm to initial position to return the gripping device into registry with a new blank in the magazine.

21. In a gear cutting machine, a work spindle, a magazine adapted to carry a plurality of gear blanks, a transfer arm for transferring a gear blank from the magazine to the work spindle, chucking mechanism for securing a blank to the work spindle, fluid pressure operated means controlling the transfer movement of said transfer arm, fluid pressure operated means controlling the operation of said chucking mechanism and a single movable member controlling the timed relation of operation of said two fluid pressure operated means.

22. In a gear cutting machine, a tool mechanism, and a work spindle, one of which is movable away from the other to inoperative position for loading, chucking mechanism for securing a gear blank to the work spindle, a magazine adapted to carry a plurality of gear blanks, a transfer arm adapted to transfer a blank from the magazine to the work spindle, and fluid pressure operated means adapted to be actuated automatically on movement of the movable part to loading position to release said chucking mechanism and thereafter actuate said transfer arm.

23. In a gear cutting machine, the combination with a tool mechanism and a work spindle, one of which is movable toward and from the other through a limited distance for alternate feeding and indexing, of fluid pressure operated means for automatically moving one of said parts an extended distance away from the other after the gear is completed.

24. In a gear cutting machine, the combination with a tool mechanism and a work spindle, one of which is movable toward and from the other through a limited distance for feeding and indexing, of fluid pressure operated means for automatically moving the movable part an extended distance away from the other after the gear is completed and means adapted to be actuated automatically on said last named movement to release the completed gear from the work spindle.

25. In a gear cutting machine, the combination with a tool mechanism and a work spindle, of means for automatically moving one of said parts an extended distance away from the other after the gear has been completed, and means adapted to be actuated on said last named movement for releasing the completed gear from the work spindle and thereafter forcing the work off the spindle.

26. In a gear cutting machine, the combination with a tool mechanism and a work spindle, of fluid pressure operated means for automatically effecting an alternate movement of feed and withdrawal between the tool mechanism and the work spindle for alternate cutting and indexing and for automatically moving one of said parts away from the other to loading position after the gear has been completed.

27. In a gear cutting machine, the combination with a tool mechanism and a work spindle, of fluid pressure operated means for automatically moving one of said parts away from the other after the gear has been completed and means adapted to be actuated on said last named movement for releasing the completed gear from the work spindle.

28. In a gear cutting machine, the combination with a tool mechanism and a work spindle, of means for moving one of said parts automatically away from the other after a gear has been completed, a magazine adapted to carry a plurality of gear blanks, a transfer member for transferring a blank from the magazine to the work spindle adapted to be actuated automatically on said withdrawal movement, and means for preventing return of the movable part into operative position if the new blank has not been positioned correctly on the work spindle, said means being released when the transfer member functions properly.

29. In a machine for producing gears, a tool mechanism and a work spindle, means for automatically moving one of said parts to loading position after the gear is completed, a magazine, means for transferring a blank from the magazine to the work spindle when said movable part is in loading position, fluid pressure operated means for returning the movable part into operative position, means preventing supply of the pressure fluid to said last named means until the new blank has been properly positioned on the work spindle, and means whereby the transfer means in its operation acts to trip said last named means.

30. In a gear cutting machine, a tool mechanism, a work support, means for moving one of said parts an extended distance away from the other to permit loading, a magazine adapted to carry a plurality of gear blanks, fluid pressure operated means operable to transfer a blank from the magazine to the work spindle, a valve adapted to remain closed during the cutting operation, and means movable with said movable part adapted to open said valve on movement of said part to loading position to permit flow of the pressure fluid to said loading mechanism to actuate the same.

31. In a gear cutting machine, a tool mechanism, a work support, means for automatically moving one of said parts an extended distance away from the other after a gear has been completed to permit loading of a new blank, a magazine adapted to carry a plurality of gear blanks, fluid pressure operated means operable to transfer a blank from the magazine to the work spindle, a valve adapted to remain closed during the cutting operation and means movable with said movable part adapted to open said valve on movement of said part to loading position to permit flow of the pressure fluid to said loading mechanism to actuate the same.

32. In a gear cutting machine, a tool mechanism, a work support, means for automatically moving one of said parts an extended distance away from the other after the gear has been completed to permit loading of a new blank, a magazine adapted to carry a plurality of gear blanks, fluid pressure operated means operable to release a blank from the work spindle, fluid pressure operated means operable to transfer a blank from the magazine to the work spindle, a valve adapted to remain closed during the cutting operation, and means adapted to open said valve on movement of said movable part to loading position to permit flow of the pressure fluid to both fluid pressure operated means to actuate the same.

33. In a machine for producing gears, a tool mechanism and a work support, means for automatically moving one of said parts an extended distance away from the other after a gear has been completed, means adapted to be put into operation on said movement to release the completed gear and chuck a new blank, means preventing return of the movable part to operative position until the new blank has been properly chucked, means operable by proper loading of the new blank for tripping said last named means, and means for automatically returning the movable part to operative position when it has been tripped.

34. In a machine for producing gears, a tool mechanism and a work support, means for moving one of said parts toward and away from the other through a limited distance, for alternate feeding and indexing, and an extended distance after the gear is completed to permit removal of the completed gear and chucking of a new blank, and means operable on movement of the movable part for controlling the speed of its movement.

35. In a machine for producing gears, a work support and a tool mechanism, fluid pressure operated means for moving one of said parts toward and away from the other through a limited distance for alternate feeding and indexing and an extended distance after the gear is completed to permit removal of the completed gear and chucking of a new blank, and valve means operable on movement of the movable part for controlling the speed of its movement.

36. In a machine for producing gears, a work spindle, a notched plate secured to the work spindle, a locking dog adapted to engage the notched plate for securing the work spindle against movement during cutting and releasable to permit indexing of the work spindle, fluid pressure operated means including a piston movable in the cylinder for operating said dog, fluid pressure operated means for rotating the work spindle when released to index the same, and connections between said cylinder and the last named fluid pressure operated means whereby said piston acts as a valve controlling the operation of said last named fluid pressure operated means.

37. In a machine for producing gears, a tool mechanism and a work support, fluid pressure operated means for moving one of said parts toward and away from the other, a pair of stops adapted to limit said movement during cutting and indexing, and means operable after a predetermined variable number of cutting operations to move one of said stops from operative position to permit movement of said movable part an extended distance away from the other part to loading position.

38. In a machine for producing gears, a tool mechanism and a work support, means for automatically moving one of said parts away from the other after the gear has been completed to permit removal of the completed gear and chucking of a new blank, means for stripping a gear from the work spindle, and means adapted to be actuated on movement of the movable part for actuating said stripping mechanism.

39. In a machine for producing gears, a tool mechanism and a work spindle, one of which is movable away from the other for loading a magazine adapted to carry a plurality of gear blanks, a transfer mechanism adapted to transfer a blank from the magazine to the work spindle, and means adapted to be actuated automatically on movement of the movable part to loading position to actuate said transfer mechanism.

40. In a machine for producing gears, a tool mechanism, and a work spindle, a magazine adapted to carry a plurality of gear blanks, a transfer arm adapted to carry a blank from the magazine to the work spindle, means for producing a relative withdrawal movement between the tool mechanism and work spindle automatically after the gear blank has been completed, means for automatically releasing the completed gear and actuating said transfer arm on the relative movement of separation of the work spindle and tool mechanism.

41. In a machine for producing gears, the combination with a tool mechanism and a work spindle, and means for securing a gear blank to the work spindle for effecting an alternate movement of feed and withdrawal between the tool mechanism and work spindle for alternate cutting and indexing and for effecting a withdrawal in the same direction as the first mentioned withdrawal movement but to a more extended distance when the gear has been completed, and means actuated on the last named movement for releasing the work securing means and thereafter forcing the completed gear off the work spindle.

42. In a machine for producing gears, a work spindle, a magazine adapted to carry a plurality of gear blanks, a transfer arm, an electro-magnet mounted on said arm and means for actuating said arm and energizing said magnet to transfer a blank from said magazine to said work spindle.

43. In a machine for producing gears, a work spindle, a magazine adapted to carry a plurality of gear blanks, a transfer arm movable to transfer a blank from the magazine to the work spindle, a member pivotally mounted on said arm and adapted to carry the blank during the movement of said arm, and means whereby the blank carrying member is rocked in opposite directions at opposite ends of the movement of the transfer arm to move the blank into registry alternately with the magazine and work spindle.

44. In a gear cutting machine, a work spindle, a magazine adapted to carry a plurality of gear blanks, a transfer arm for transferring blanks from the magazine to the work spindle, separate means for reciprocating said arm and oscillating the same to effect said transfer movement, and a single member controlling the timed relation of operation of said separate operating means.

45. In a gear cutting machine, a work spindle, a blank holder adapted to carry gear blanks, a transfer arm for transferring blanks from the blank holder to the work spindle, fluid-pressure operated means including a piston reciprocable in a cylinder for oscillating said arm and separate fluid-pressure operated means including a piston reciprocable in a cylinder for reciprocating said arm, and a single member controlling the timed relation of operation of said separate fluid-pressure operated means to effect the transfer operation.

46. In a gear cutting machine, a tool mechanism and a work spindle, one of which is movable away from the other to inoperative position for loading, a magazine adapted to carry a plurality of gear blanks, a transfer arm adapted to transfer a blank from the magazine to the work spindle, fluid-pressure operated means for operating the transfer arm, fluid-pressure operated means for returning the movable part to operating position after the loading has been completed, and a single rotary member controlling the timed relation of operation of said fluid-pressure operated means, said member being put into operation automatically on movement of the movable part to loading position.

47. In a gear cutting machine, a tool mechanism and a work spindle, one of which is movable away from the other for loading, a magazine adapted to carry a plurality of gear blanks, a transfer arm for transferring blanks from the magazine to the work spindle, and means operable when the movable part is moved to loading position to transfer a blank from the magazine to the work spindle, and means operable, when the transfer mechanism has functioned, to return the movable part to operative position.

48. In a machine of the class described, a pair of supports, one of which is a work support, means for moving one of said supports toward the other to effect a working operation and for withdrawing said support away from the other to permit removal of a completed work-piece and chucking of a new blank, a blank holder, a transfer arm for transferring blanks from the blank holder to the work support, separate fluid-pressure operated means for reciprocating and oscillating said transfer arm to effect the transfer operation, a rotary member controlling the sequence of operation of the transfer mechanism, and means operable on movement of the movable support to loading position to actuate said rotary member.

49. In a machine of the class described, a pair of supports, one of which is a work support, means for moving one of said supports toward the other to effect a working operation and for withdrawing said support away from the other to permit removal of a completed work-piece and chucking of a new blank, chucking mechanism for securing a work-piece to the work support, a blank-holder, transfer mechanism for transferring a blank from the blank-holder to the work support, means for releasing the chucking mechanism, separate means for actuating said chuck releasing mechanism and said transfer mechanism, a rotary member for controlling the sequence of operation of said separate actuating means, and means operable on movement of the movable support to loading position to rotate said rotary member.

50. In a machine of the class described, a work support, a blank-holder, transfer mechanism operative when the work support is in loading position to transfer a blank from the blank-holder to the work support and return to the blank-holder in registry with a new blank, means operated by the transfer mechanism, when it has functioned, to return the work support to operative position.

51. In a machine for producing gears, a blank-holder, a work spindle, means for effecting a cutting operation on the gear and then moving the work spindle to loading position, transfer mechanism for transferring a blank from the blank holder to the work spindle, and means operative on movement of the work spindle to loading position to release the gear carried by the work spindle, strip the same from the work spindle, actuate the transfer mechanism, chuck a new blank on the work spindle, and return the transfer mechanism into registry with a new blank in the blank-holder.

52. In a machine for producing gears, a blank-holder, a work spindle, means for effecting a cutting operation on the gear and then moving the work spindle to loading position, transfer mechanism for transferring a blank from the blank-holder to the work spindle, and means operative on movement of the work spindle to loading position to release the gear carried by the work spindle, strip the same from the work spindle, actuate the transfer mechanism, chuck a new blank on the work spindle, return the transfer mechanism into registry with a new blank carried by the work holder and means operated, when the transfer mechanism has functioned, to return the work spindle to operative position.

53. In a machine of the class described, a blank-holder, a work support, means for transferring a blank from the blank-holder to the work support while the work support is at loading position comprising an arm, an electrically operated blank-gripping device carried by said arm, means for moving the arm from the blank holder to the work support, and means controlling the operation of the gripping device so that a blank is gripped when the gripping device is in registry with the blank-holder and released when the arm has carried a blank onto the work support.

54. In a machine of the class described, a blank-holder, a work support, transfer mechanism for transferring a blank from the blank-holder to the work support comprising a transfer arm, a gripping device carried by said arm having a portion thereof adapted to enter the bore of a blank, and means for actuating the transfer mechanism to cause the same to transfer a blank from the blank-holder to the work support.

55. In a machine of the class described, a blank-holder, a work support, a transfer mechanism for transferring a blank from the blank-holder to the work support comprising a transfer arm, a gripping device carried by said arm having a portion thereof adapted to enter the bore of a gear blank, and means for actuating said transfer mechanism to cause the same to transfer a blank from the blank-holder to the work support and then return into registry with the blank holder.

56. In a machine for producing gears, a work spindle, an arbor mounted in the bore of the work spindle and adapted to support a gear blank, a stripper member slidable on said arbor and adapted to be interposed between the rear face of a blank and the nose of said arbor, chucking mechanism for the blank, and means for sliding said stripping member forward on the arbor to strip a blank from the arbor after the chucking mechanism has been released.

57. In a machine for producing gears, a work spindle, an arbor mounted in the bore of the work spindle and formed at its front end to provide an expansible collet adapted to enter the bore of a gear blank to grip the same, a stripper member slidable on said arbor and adapted to be interposed between the rear face of a gear blank mounted on the arbor and the nose of the arbor, a draw-bar formed with a taper head and slidable in opposite directions in the bore of the arbor to actuate the collet into gripping position or to release the same, respectively, and means for sliding said stripping member forward on the arbor to strip a blank off the arbor after the chuck has been released.

58. In a machine for producing gears, a work support, a work spindle journaled in the work support, an arbor mounted in the bore of the work spindle and adapted to support a gear blank, a stripper member slidable on said arbor and adapted to be interposed between the rear face of a blank and the nose of said arbor, chucking mechanism for securing a gear blank to the arbor and spindle, means for moving the work spindle to inoperative position, and means operative automatically on said movement to release said chucking mechanism and slide said stripping member forward on said arbor to strip a blank from the arbor.

HERBERT J. WHITE.